US008764866B2

(12) United States Patent
Mitsuda et al.

(10) Patent No.: US 8,764,866 B2
(45) Date of Patent: Jul. 1, 2014

(54) ENGINE DEVICE

(75) Inventors: Masataka Mitsuda, Osaka (JP); Takayuki Onodera, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 587 days.

(21) Appl. No.: 12/998,022

(22) PCT Filed: Sep. 7, 2009

(86) PCT No.: PCT/JP2009/065601
§ 371 (c)(1), (2), (4) Date: Mar. 9, 2011

(87) PCT Pub. No.: WO2010/032647
PCT Pub. Date: Mar. 25, 2010

(65) Prior Publication Data

US 2011/0155263 A1 Jun. 30, 2011

(30) Foreign Application Priority Data

Sep. 18, 2008 (JP) ................................ 2008-239299

(51) Int. Cl.
*B01D 46/00* (2006.01)

(52) U.S. Cl.
USPC ........................ 55/385.3; 55/DIG. 30; 60/311

(58) Field of Classification Search
USPC ....... 55/385.3, DIG. 30; 123/198 E; 422/171, 422/177, 180; 60/285, 297, 299, 310
See application file for complete search history.

(56) References Cited

U.S. PATENT DOCUMENTS 8,105,545 B2 * 1/2012 Sato .............................. 422/180
8,420,019 B2 * 4/2013 Saito et al. .................... 422/180
2004/0067177 A1 * 4/2004 Thieman et al. .............. 422/177
2004/0213707 A1 * 10/2004 Prommersberger et al. .. 422/180
2005/0220679 A1 * 10/2005 Choi ............................ 422/177
2007/0178026 A1 * 8/2007 Roth et al. .................... 422/177
2010/0086446 A1 4/2010 Matsunaga et al.
2010/0319320 A1 * 12/2010 Mital et al. ...................... 60/285

FOREIGN PATENT DOCUMENTS

JP 6-074045 3/1994
JP 2000-145430 5/2000
JP 2001-173429 6/2001
JP 2001-303614 10/2001

(Continued)

OTHER PUBLICATIONS

Microfilm of the specification and drawings annexed to the request of Japanese Utility Model Application No. 3536/1991 (Laid -open No. 93712/1992) (Tokyo Roki Co., Ltd.) Aug. 14, 1992, paragraph [0008]; Fig. 1 (Family: none) JP 4-73712 (Aug. 14, 1992).

*Primary Examiner* — Duane Smith
*Assistant Examiner* — Minh-Chau Pham
(74) *Attorney, Agent, or Firm* — Jordan and Hamburg LLP

(57) ABSTRACT

An engine device is disclosed in which a gas purifying filter can be disposed, with high rigidity, in an engine as one constituent part of the engine and the need of countermeasures against exhaust gas for each of the devices of a vehicle is eliminated, and general versatility of the engine can be enhanced. The engine device includes a diesel engine having an exhaust manifold, and an exhaust gas purifying device which purifies exhaust gas discharged from the diesel engine. A plurality of filter supporting bodies which support the exhaust gas purifying device are provided on an upper portion of a flywheel housing in the diesel engine. The exhaust gas purifying device is connected to the exhaust manifold and connected to the flywheel housing through the plurality of filter supporting bodies.

6 Claims, 22 Drawing Sheets

(56) References Cited

FOREIGN PATENT DOCUMENTS

| | | |
|---|---|---|
| JP | 2003-027922 | 1/2003 |
| JP | 2003-104071 | 4/2003 |
| JP | 2004-340114 | 12/2004 |
| JP | 2005-016374 | 1/2005 |
| JP | 2008-082201 | 4/2008 |

* cited by examiner

ENGINE DEVICE

TECHNICAL FIELD

The present invention of this application relates to an engine apparatus used for a utility machine such as a backhoe, a forklift, and a tractor, and more particularly, to a mounting structure of an exhaust gas purifying device on an engine.

BACKGROUND Of THE INVENTION

Conventionally, there is known a technique in which a diesel particulate filter (or NOx catalyst) is provided in an exhaust passage of a diesel engine as an exhaust gas purifying device (postprocessing device), and exhaust gas discharged from the diesel engine is purified by the diesel particulate filter (or NOx catalyst) (see patent documents 1, 2 and 3). There is also known a technique in which a filter case (inner case) is provided in a casing (outer case) and a particulate filter is disposed in the filter case.

CITATION LIST

Patent document 1: Japanese Patent Application Laid-open No. 2000-145430

Patent document 2: Japanese Patent Application Laid-open No. 2003-27922

Patent document 3: Japanese Patent Application Laid-open No. 2008-82201

Patent document 4: Japanese Patent Application Laid-open No. 2001-173429

SUMMARY OF THE INVENTION

Diesel engines have wide general versatility, and are used in various fields such as agricultural utility machines, construction machines and vessels. Installation spaces of diesel engines vary depending upon machines in which the diesel engines are provided but in recent years, the installation spaces are limited (narrow) in many cases due to requests for reducing weight and size. Further, in the above-described exhaust gas purifying device, it is desirable in terms of function that a temperature of exhaust gas which passes through the exhaust gas purifying device is high (e.g., 300° C. or higher). For this reason, it is required to mount the exhaust gas purifying device in the diesel engine.

When the exhaust gas purifying device is mounted in the diesel engine, however, there are problems that engine vibration is prone to be transmitted directly to the exhaust gas purifying device by the driving operation, and that if cooling wind from a cooling fan provided in the diesel engine is blown directly to the exhaust gas purifying device, there is an adverse possibility that a temperature of the exhaust gas purifying device and thus the temperature of the exhaust gas are lowered.

Hence, it is an object of the invention of the application to meet such requirements.

To achieve the above object, according to an invention, there is provided an engine device comprising an engine having an intake manifold and an exhaust manifold, and an exhaust gas purifying device which purifies exhaust gas from the engine, wherein the exhaust gas purifying device is connected to the exhaust manifold, the engine device further includes a filter supporting body which supports the exhaust gas purifying device, and the exhaust gas purifying device is connected to a flywheel housing disposed in the engine through the filter supporting body.

According to an invention, in the engine device, the filter supporting body is provided on an upper portion of the flywheel housing, and the exhaust gas purifying device is connected to the upper portion of the flywheel housing through the filter supporting body.

According to an invention, in the engine device, the exhaust gas purifying device is long in a direction perpendicular to an output shaft of the engine, and the exhaust gas purifying device is disposed such that it is separated away from an upper surface of the engine.

According to an invention, in the engine device, a cooling fan is provided on a side surface of the engine which is opposite from the flywheel housing, and the exhaust gas purifying device is disposed such that it is opposed to one side surface of a cylinder head located on an upper portion of the engine on the side of the flywheel housing.

According to an invention, in the engine device, a height of an upper surface of the exhaust gas purifying device is lower than a height of the upper surface of the engine, and the exhaust gas purifying device does not project upward higher than the upper surface of the engine.

According to an invention, in the engine device, the intake manifold and the exhaust manifold are disposed on an upper portion side of the engine on both sides such as to sandwich the cylinder head of the engine as viewed from above, and the exhaust gas purifying device is connected to the exhaust manifold and the intake manifold above the engine.

According to an invention, in the engine device, an exhaust gas inflow opening and an exhaust gas outflow opening are disposed on one end side and the other end side of the exhaust gas purifying device in its longitudinal direction, the exhaust gas inflow opening is disposed in one end of the exhaust gas purifying device on a side where the intake manifold is installed, and the exhaust gas outflow opening is disposed in the other end of the exhaust gas purifying device on a side where the exhaust manifold is installed.

The invention provides an engine device comprising an engine having an intake manifold and an exhaust manifold, and an exhaust gas purifying device which purifies exhaust gas from the engine, wherein the exhaust gas purifying device is connected to the exhaust manifold, the engine device further includes a filter supporting body which supports the exhaust gas purifying device, and the exhaust gas purifying device is connected to a flywheel housing disposed in the engine through the filter supporting body. Therefore, there are effects that the exhaust gas purifying device can be disposed in the engine with high rigidity as one constituent part of the engine, the need of countermeasures against exhaust gas for each of devices of a utility vehicle is eliminated, and general versatility of the engine can be enhanced. That is, the exhaust gas purifying device is supported with high rigidity utilizing the flywheel housing which is a high rigidity part of the engine, and it is possible to prevent the exhaust gas purifying device from being damaged by vibration.

According to the invention, the filter supporting body is provided on an upper portion of the flywheel housing, and the exhaust gas purifying device is connected to the upper portion of the flywheel housing through the filter supporting body. Therefore, there are effects that the space above the flywheel housing is effectively utilized, and the engine and the exhaust gas purifying device can be configured together compactly. This configuration can also contribute to reduction of the exhaust gas purifying device in size.

According to the invention, the exhaust gas purifying device is long in a direction perpendicular to an output shaft of the engine, and the exhaust gas purifying device is disposed such that it is separated away from an upper surface of the engine. Therefore, the upper surfaces of the cylinder head, the exhaust manifold and the intake manifold can be exposed, and there is an effect that the maintenance operation of the engine is easy.

According to the invention, a cooling fan is provided on a side surface of the engine which is opposite from the flywheel housing, and the exhaust gas purifying device is disposed such that it is opposed to one side surface of a cylinder head located on an upper portion of the engine on the side of the flywheel housing. Therefore, the exhaust gas purifying device is hidden by the cylinder head under the wind of the cooling fan. There are effects that this prevents wind from the cooling fan from directly hitting the exhaust gas purifying device, it is possible to suppress reduction in temperature of the exhaust gas purifying device and thus temperature of exhaust gas in the exhaust gas purifying device by wind from the cooling fan, and the temperature of exhaust gas can be maintained.

According to the invention, a height of an upper surface of the exhaust gas purifying device is lower than a height of the upper surface of the engine, and the exhaust gas purifying device does not project upward higher than the upper surface of the engine. Therefore, the influence of the exhaust gas purifying device on the entire height of the engine can be eliminated. Thus, even if the exhaust gas purifying device is assembled into the engine, there are effects that the entire height of the engine can be suppressed as low as possible, a barycenter of the engine can be lowered, and vibration isolation can be enhanced. There is also a merit that it is possible to reliably prevent wind from the cooling fan from directly hitting the exhaust gas purifying device of course.

According to the invention, the intake manifold and the exhaust manifold are disposed on an upper portion side of the engine on both sides such as to sandwich the cylinder head of the engine as viewed from above, and the exhaust gas purifying device is connected to the exhaust manifold and the intake manifold above the engine. Since the exhaust manifold, the intake manifold, and the cylinder head which are high rigidity parts of the engine are utilized, the exhaust gas purifying device can be supported with higher rigidity than that of claim 1, and it is possible to effectively prevent the exhaust gas purifying device from being damaged by vibration.

According to the invention, the exhaust gas inflow opening and an exhaust gas outflow opening are disposed on one end side and the other end side of the exhaust gas purifying device in its longitudinal direction, the exhaust gas inflow opening is disposed in one end of the exhaust gas purifying device on a side where the intake manifold is installed, and the exhaust gas outflow opening is disposed in the other end of the exhaust gas purifying device on a side where the exhaust manifold is installed. Therefore, the exhaust gas purifying device can be connected and supported in a state where the exhaust gas purifying device is close to the upper surface of the cylinder head. Further, the exhaust gas purifying device can be brought into communication with the exhaust manifold within a short distance, and it is possible to suppress the reduction in temperature of the exhaust gas which passes through the exhaust gas purifying device. Thus, there is an effect that the exhaust gas purifying ability of the exhaust gas purifying device can be maintained at a high level.

DESCRIPTION OF THE PREFERRED EMBODIMENTS

An embodiment in which the present invention is put into effect will be described based on the drawings. In the following description, an inflow side of exhaust gas is called a left side, and a discharge side of exhaust gas is called a right side.

First, an entire structure of an exhaust gas purifying device will be described with reference to FIGS. 1 to 9. As shown in FIGS. 1 to 5, a continuous regeneration type diesel particulate filter 1 (DPF, hereinafter) as an exhaust gas purifying device of the embodiment is provided. The DPF 1 is for physically collecting particulate matter (PM) in exhaust gas. The DPF 1 has such a structure that a diesel oxidation catalyst 2 such as platinum for producing nitrogen dioxide ($NO_2$), and a soot filter 3 of honeycomb structure for continuously oxidizing and removing the collected particulate matter (PM) at a relatively low temperature are arranged in series in a moving direction of exhaust gas (from a left side to a right side in FIG. 1). The DPF 1 is configured such that the soot filter 3 is continuously regenerated. The DPF 1 can remove the particle matter (PM) in exhaust gas and also reduce carbon monoxide (CO) and hydrocarbon (HC) in exhaust gas.

Figure 1:
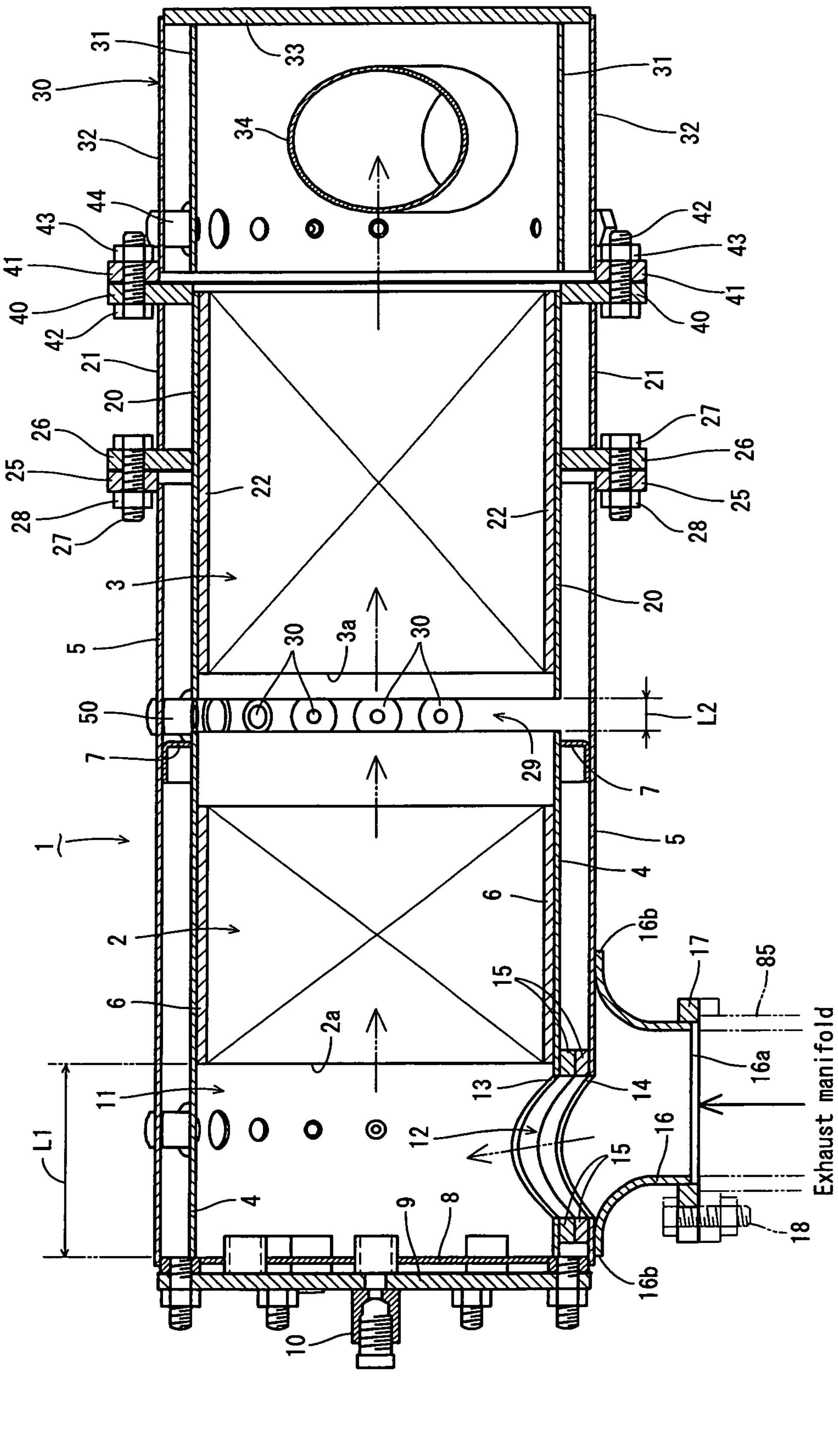
FIG. 1 is a front sectional view of an exhaust gas purifying device according to an embodiment.
Figure 5:
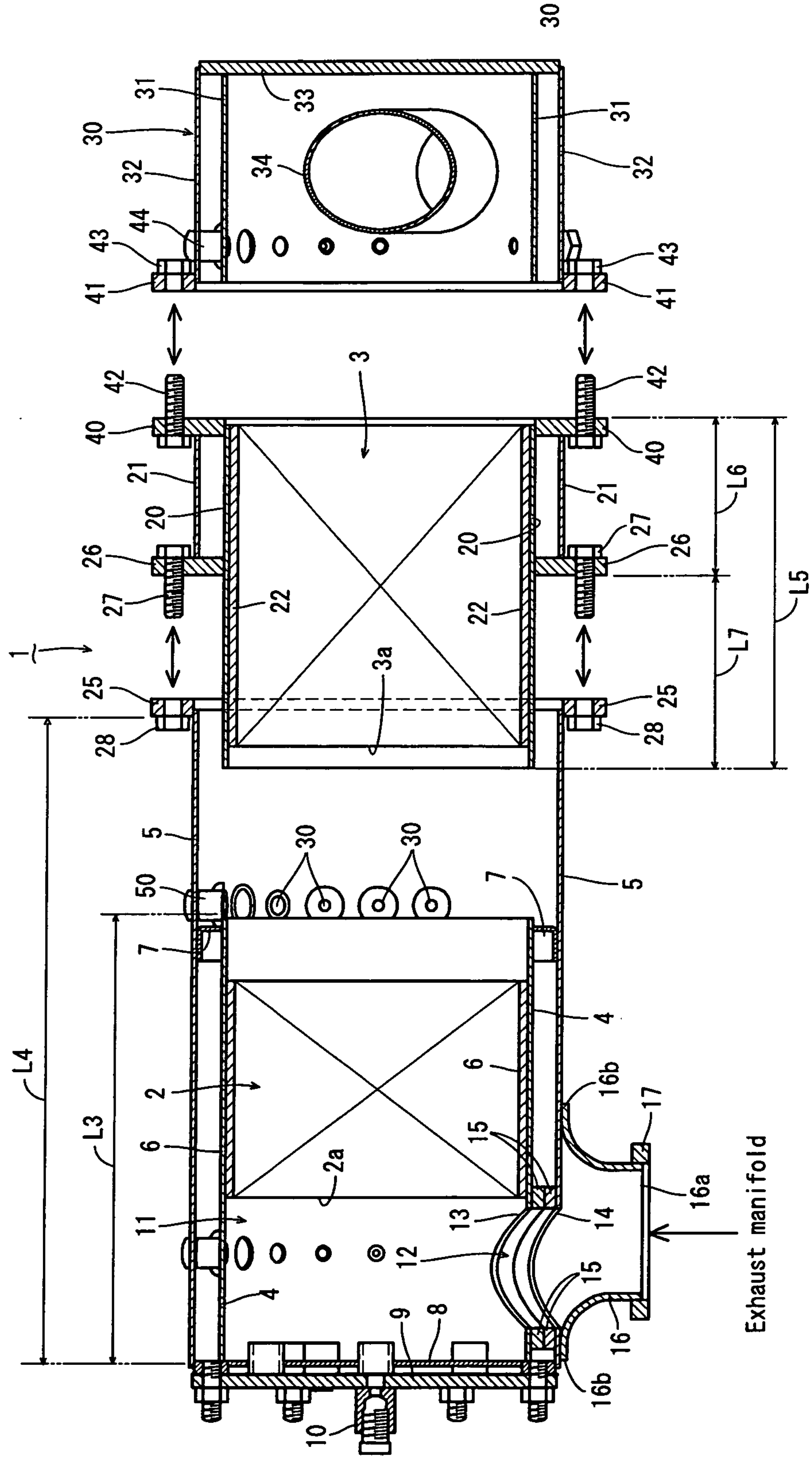
FIG. 5 is a front exploded sectional view of FIG. 1.

A mounting structure of the diesel oxidation catalyst 2 will be described with reference to FIGS. 1 and 5. As shown in FIGS. 1 and 5, the diesel oxidation catalyst 2 as a gas purifying filter which purifies exhaust gas discharged from an engine is provided in a substantially cylindrical catalyst inner case 4 made of heatproof metal. The catalyst inner case 4 is provided in a substantially cylindrical catalyst outer case 5 made of heatproof metal. That is, the catalyst inner case 4 is fitted over the diesel oxidation catalyst 2 through a mat-like catalyst heat insulator 6 made of ceramic fiber. The catalyst outer case 5 is fitted over the catalyst inner case 4 through a thin plate support body 7 having I-shaped end surface. The diesel oxidation catalyst 2 is protected by the catalyst heat insulator 6. A stress (deformation force) of the catalyst outer case 5 transmitted to the catalyst inner case 4 is reduced by the thin plate support body 7.

As shown in FIGS. 1 and 5, a disk-like left lid body 8 is fixed to left ends of the catalyst inner case 4 and the catalyst outer case 5 by welding. Sensor connecting plugs 10 are fixed to the left lid body 8 through a seat body 9. A left end surface 2*a* of the diesel oxidation catalyst 2 and the left lid body 8 are opposed to each other at a constant distance L1 for a gas inflow space. An exhaust gas inflow space 11 is formed between the left lid body 8 and the left end surface 2*a* of the diesel oxidation catalyst 2. An inlet-side exhaust gas pressure sensor and an inlet-side exhaust gas temperature sensor (both not shown) are connected to the sensor connecting plug 10.

Figure 9:
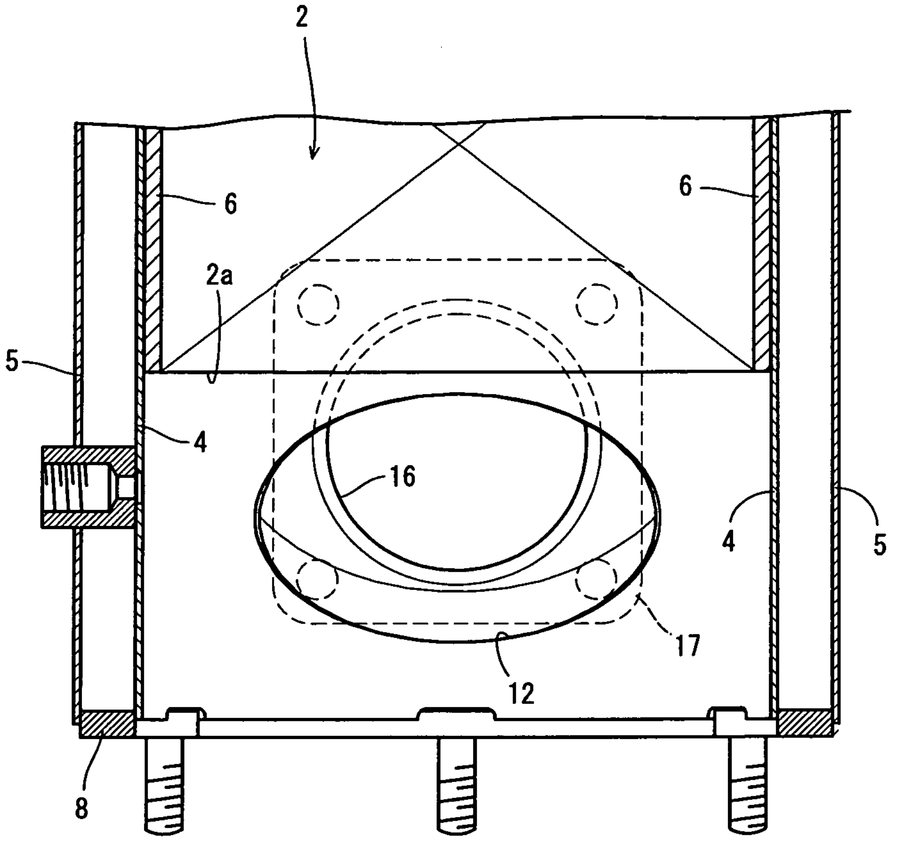
FIG. 9 is an enlarged plan sectional view thereof on the inflow side of exhaust gas.

As shown in FIGS. 1, 5 and 9, an elliptic exhaust gas inflow opening 12 is formed in left ends of the catalyst inner case 4 and the catalyst outer case 5 where the exhaust gas inflow space 11 is formed. The elliptic exhaust gas inflow opening 12 has a shorter diameter in a moving direction of exhaust gas (direction of center lines of the cases 4 and 5), and has a longer diameter in a direction perpendicular to the moving direction of exhaust gas (direction of center lines of the cases 4 and 5). A closing-ring body 15 is clamped and fixed between an opening edge 13 of the catalyst inner case 4 and an opening edge 14 of the catalyst outer case 5. A gap between the opening edge 13 of the catalyst inner case 4 and the opening edge 14 of the catalyst outer case 5 is closed with a closing-ring body 15. The closing-ring body 15 prevents exhaust gas from flowing in between the catalyst inner case 4 and the catalyst outer case 5.

As shown in FIGS. 1, 3, 5, and 8, an exhaust gas inflow opening 12 is formed in an outer surface of the catalyst outer case 5, and an exhaust gas inlet tube 16 is disposed on the outer surface of the catalyst outer case 5. An exhaust connecting flange body 17 is welded to a small diameter perfect circle opening end 16*a* on the side of the of the exhaust gas inlet tube 16. The exhaust connecting flange body 17 is fastened to an exhaust manifold 71 of a later-described diesel engine 70 through a bolt 18. A large diameter perfect circle opening end 16*b* of the exhaust gas inlet tube 16 is welded to an outer surface of the catalyst outer case 5. The exhaust gas inlet tube 16 spreads out wide (trumpet shape) from the small diameter perfect circle opening end 16*a* toward the large diameter perfect circle opening end 16*b*.

Figure 8:
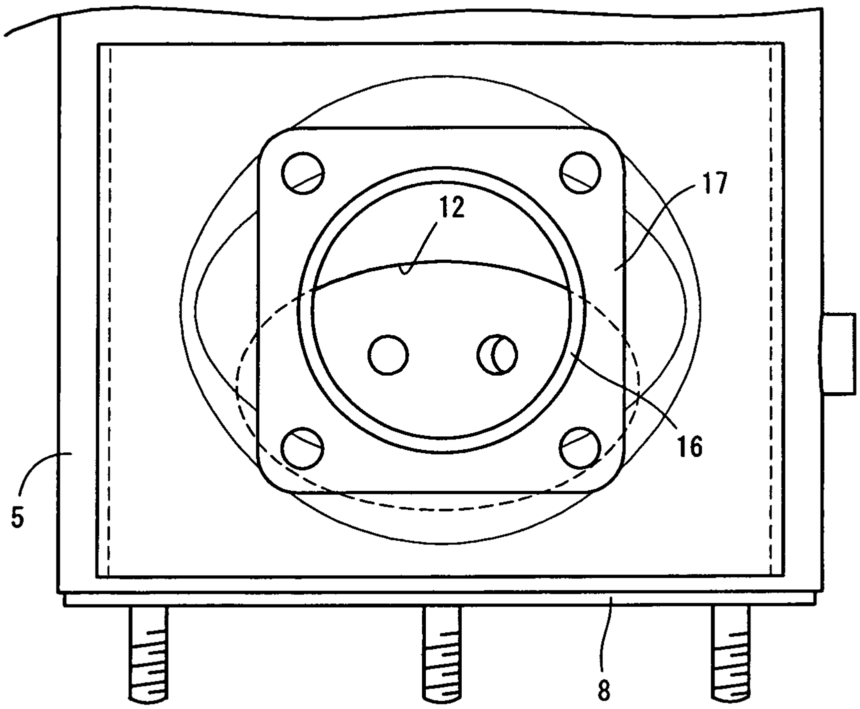
FIG. 8 is an enlarged bottom view thereof on the inflow side of exhaust gas.

As shown in FIGS. 1, 5, and 8, a left end of the large diameter perfect circle opening end 16*b* is welded to an outer surface of a left end of the opening edge 14 of the outer surface of the catalyst outer case 5. That is, the exhaust gas inlet tube 16 (large diameter perfect opening end 16*b*) is offset toward the downstream in the moving direction of exhaust gas (right side of the catalyst outer case 5) with respect to the elliptic exhaust gas inflow opening 12. That is, the elliptic exhaust gas inflow opening 12 is offset toward the upstream in the moving direction of exhaust gas (left side of the catalyst outer case 5) with respect to the exhaust gas inlet tube 16 (large diameter perfect opening end 16*b*), and the exhaust gas inflow opening 12 is formed in the catalyst outer case 5.

Figure 2:
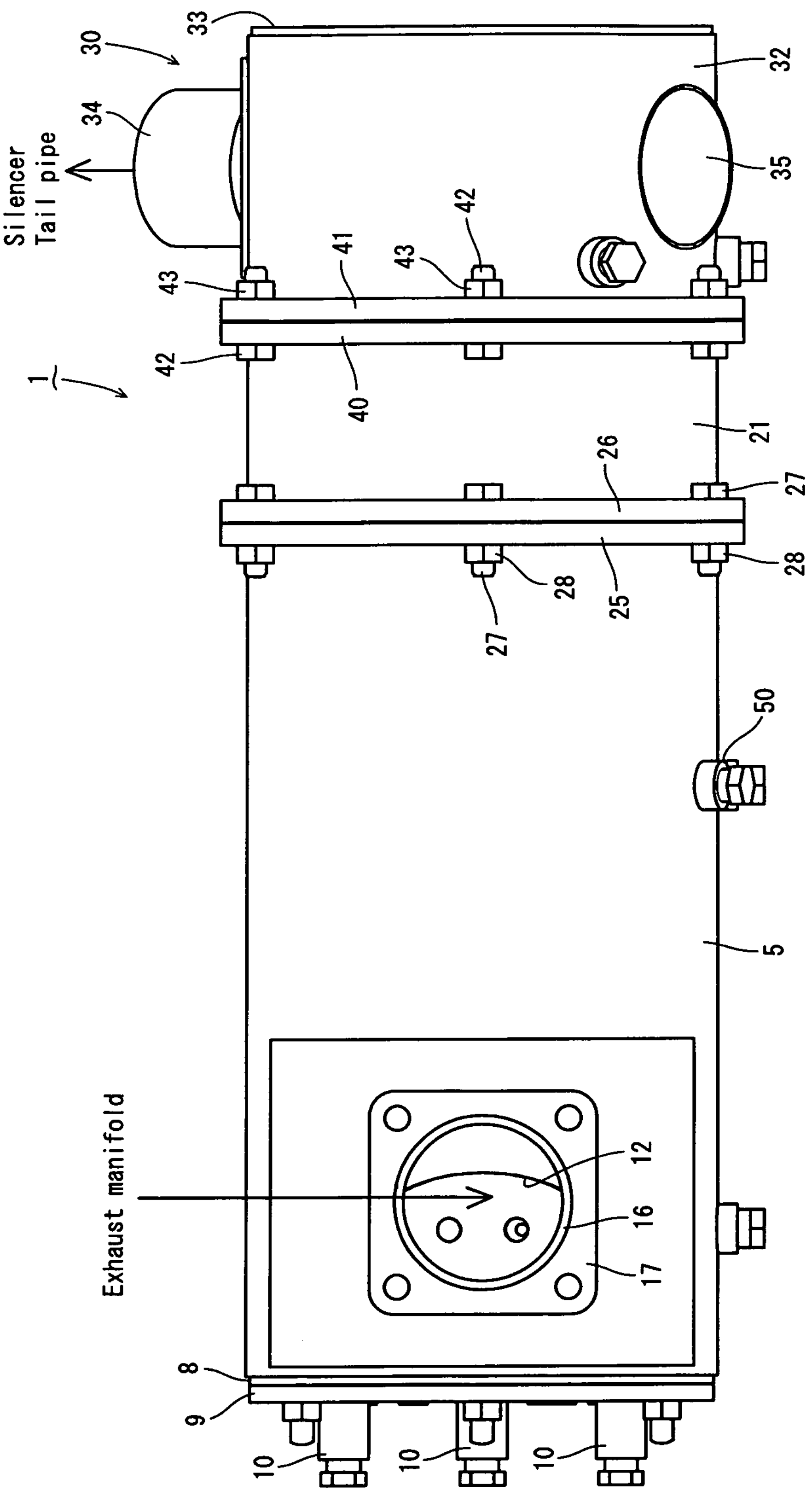
FIG. 2 is a bottom view of an exterior appearance thereof.
Figure 3:
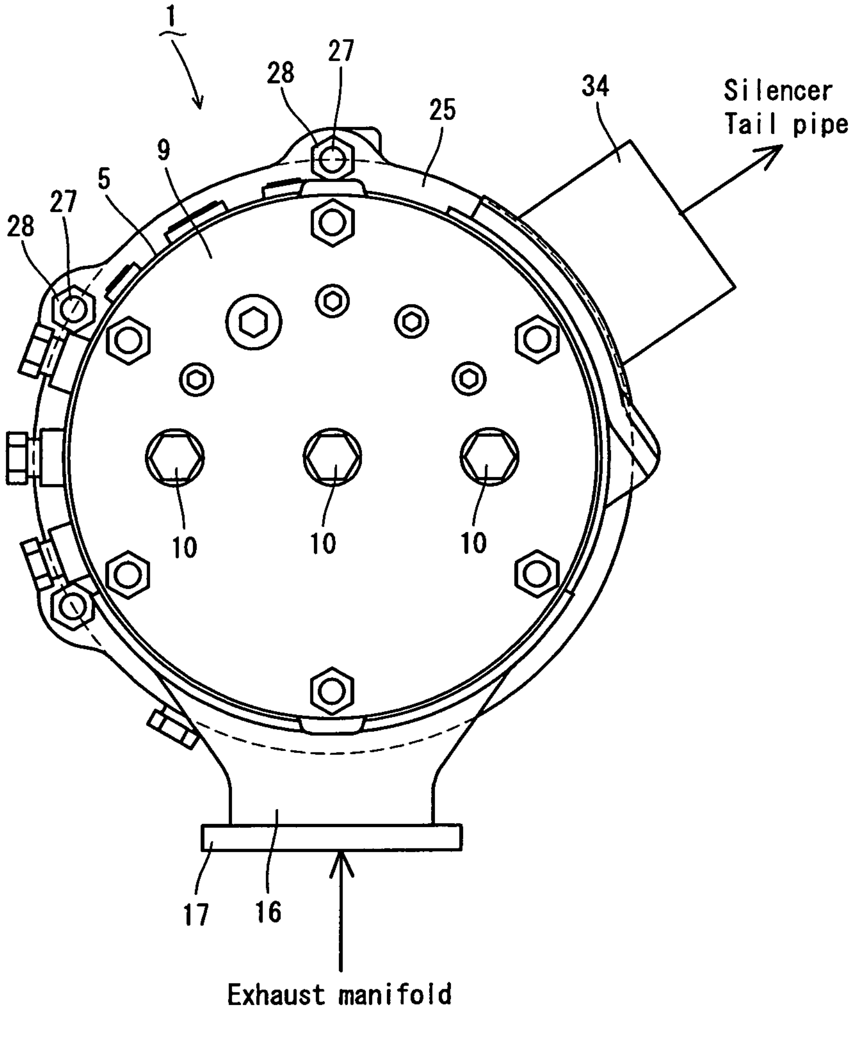
FIG. 3 is a left side view thereof as viewed from an inflow side of exhaust gas.
Figure 4:
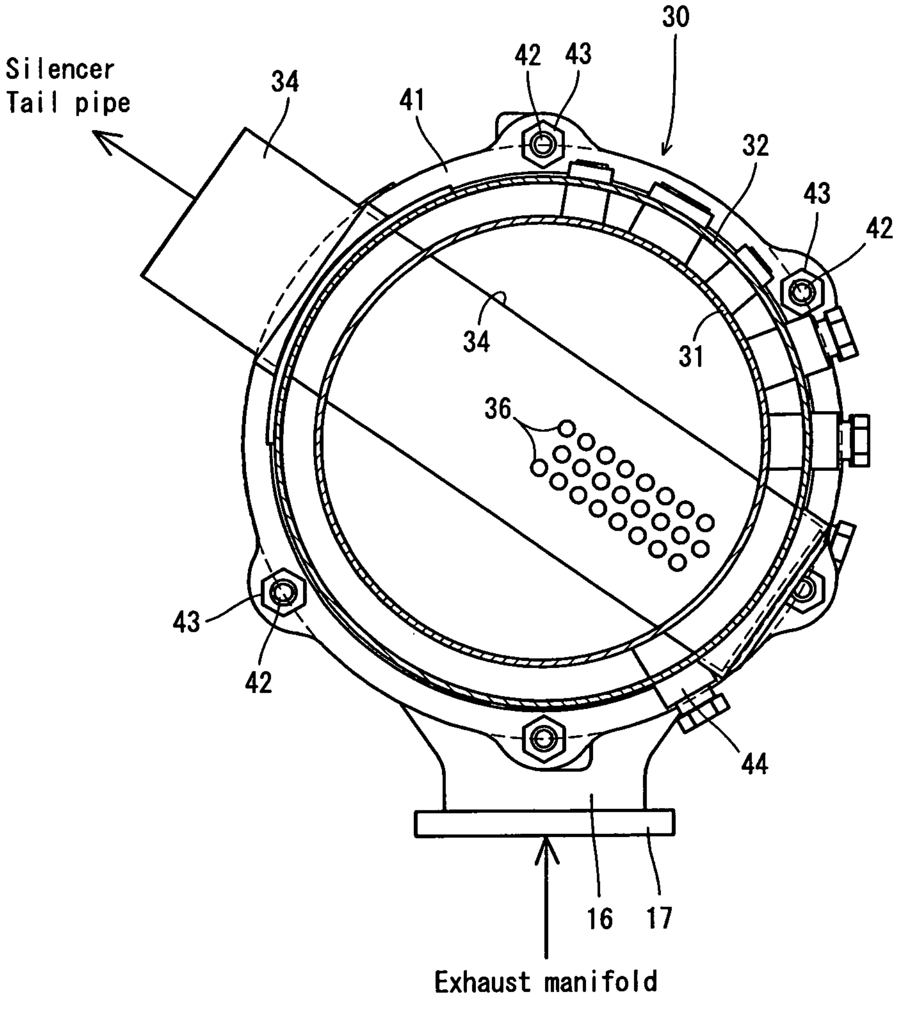
FIG. 4 is a right side view thereof as viewed from a discharge side of exhaust gas.

According to the above-described configuration, exhaust gas from the engine 70 enters the exhaust gas inlet tube 16 from the exhaust manifold 71, enters the exhaust gas inflow space 11 from the exhaust gas inlet tube 16 through the exhaust gas inflow opening 12, and is supplied to the diesel oxidation catalyst 2 from the left end surface 2*a*. Nitrogen dioxide ($NO_2$) is generated by oxidation action of the diesel oxidation catalyst 2. As shown in FIGS. 2 to 4, supporting legs 19 are welded to an outer peripheral surface of the catalyst outer case 5. When the DPF 1 is mounted in the engine 70, the catalyst outer case 5 is fixed to a later-described cylinder head 72 of the engine 70 through the supporting legs 19.

A mounting structure of the soot filter 3 will be described with reference to FIGS. 1 and 5. As shown in FIGS. 1 and 5, the soot filter 3 as the gas purifying filter which purifies exhaust gas discharged from the engine 70 is provided in a substantially cylindrical filter inner case 20 made of heat-proof metal. The inner case 4 is provided in a substantially cylindrical filter outer case 21 made of heatproof metal. That is, the filter inner case 20 is fitted over the soot filter 3 through a mat-like filter heat insulator 22 made of ceramic fiber. The soot filter 3 is protected by the filter heat insulator 22.

As shown in FIGS. 1 and 5, a catalyst-side flange 25 is welded to an end of the catalyst outer case 5 on the down-stream side (right side) in the moving direction of exhaust gas. A filter-side flange 26 is welded to an intermediate portion of the filter inner case 20 in the moving direction of exhaust gas and to an end of the filter outer case 21 on the upstream side (left side) in the moving direction of exhaust gas. The catalyst-side flange 25 and the filter-side flange 26 are detachably fastened to each other through bolts 27 and nuts 28. A diameter size of the cylindrical catalyst inner case 4 and a diameter size of the cylindrical filter inner case 20 are substantially the same. A diameter size of the cylindrical catalyst outer case 5 and a diameter size of the cylindrical filter outer case 21 are substantially the same.

As shown in FIG. 1, in a state where the filter outer case 21 is connected to the catalyst outer case 5 through the catalyst-side flange 25 and the filter-side flange 26, an end of the filter inner case 20 on the upstream side (left side) in the moving direction of exhaust gas is opposed to an end of the catalyst inner case 4 on the downstream side (right side) in the moving direction of exhaust gas at a constant distance L2 for mounting sensor. That is, a sensor-mounting space 29 is formed between the end of the catalyst inner case 4 on the down-stream side (right side in the moving direction of exhaust gas and the end of the filter inner case 20 on the upstream side (left side) in the moving direction of exhaust gas. A sensor connecting plug 50 is fixed to the catalyst outer case 5 at a location of the sensor-mounting space 29. A filter inlet-side exhaust gas pressure sensor and a filter inlet-side exhaust gas temperature sensor (thermistor) are connected to the sensor connecting plug 50.

As shown in FIG. 5, a cylinder length L4 of the catalyst outer case 5 in the moving direction of exhaust gas is longer than a cylinder length L3 of the catalyst inner case 4 in the moving direction of exhaust gas. A cylinder length L6 of the filter outer case 21 in the moving direction of exhaust gas is shorter than a cylinder length L5 of the filter inner case 20 in the moving direction of exhaust gas. A length (L2+L3+L5) which is a sum of a constant distance L2 of the sensor-mounting space 29, the cylinder length L3 of the catalyst inner case 4, and the cylinder length L5 of the filter inner case 20 is substantially equal to a length (L4+L6) which is a sum of the cylinder length L4 of the catalyst outer case 5 and the cylinder length L6 of the filter outer case 21. An end of the filter inner case 20 on the upstream side (left side) in the moving direction of exhaust gas projects from an end of the filter outer case 21 on the upstream side (left side) in the moving direction of exhaust gas by a difference (L7=L5−L6) of the lengths thereof. That is, when the filter outer case 21 is connected to the catalyst outer case 5, the end of the filter inner case 20 on the upstream side (left side) in the moving direction of exhaust gas is inserted into the catalyst outer case 5 on the downstream side (right side) in the moving direction of exhaust gas by the overlap size L7.

According to the above-described configuration, nitrogen dioxide ($NO_2$) generated by oxidation action of the diesel oxidation catalyst 2 is supplied from the left end surface 3*a* to the soot filter 3. Collected particulate matter (PM) in exhaust gas of the diesel engine 70 collected by the soot filter 3 is continuously oxidized and removed by nitrogen dioxide ($NO_2$) at a relatively low temperature. The particulate matter (PM) in the exhaust gas of the diesel engine 70 is removed, and carbon monoxide (CO) and hydrocarbon (HC) in the exhaust gas of the diesel engine 70 are reduced.

As shown in FIGS. 1 to 5, the exhaust gas purifying device includes the diesel oxidation catalyst 2 and the soot filter 3 as gas purifying filters which purify exhaust gas discharged from the diesel engine 70, the catalyst inner case 4 and the filter inner case 20 in which the diesel oxidation catalyst 2 and the soot filter 3 are provided, and the catalyst outer case 5 and the filter outer case 21 in which the catalyst inner case 4 and the filter inner case 20 are provided. The exhaust gas purifying device includes a plurality set of diesel oxidation catalyst 2, soot filter 3, catalyst inner case 4, filter inner case 20, catalyst outer case 5, and filter outer case 21. The catalyst-side flange 25 and the filter-side flange 26 as flange bodies which connect the catalyst outer case 5 and the filter outer case 21 to each other are offset from a connecting boundary position between the diesel oxidation catalyst 2 and the soot filter 3. Therefore, a distance of the joint portion between the diesel oxidation catalyst 2 and the soot filter 3 can be shortened, and a connection length between the catalyst outer case 5 and the filter outer case 21 can be shortened. A gas sensor or the like can easily be disposed at the connecting boundary position between the diesel oxidation catalyst 2 and the soot filter 3. Since lengths of the catalyst outer case 5 and the filter outer case 21 in the moving direction of exhaust gas can be shortened, rigidity of the catalyst outer case 5 and the filter outer case 21 can be enhanced, and weights thereof can be reduced.

As shown in FIGS. 1 to 5, the two kinds of diesel oxidation catalyst 2 and soot filter 3 are provided. The catalyst outer case 5 in which the catalyst inner case 4 of one of the diesel oxidation catalyst 2 is provided overlaps the filter inner case 20 in which the other soot filter 3 is provided. Therefore, lengths of the diesel oxidation catalyst 2 and the soot filter 3 in the moving direction of exhaust gas are secured, and lengths of the catalyst outer case 5 and the filter outer case 21 in the moving direction of exhaust gas can be shortened. The catalyst outer case 5 overlaps the catalyst inner case 4 (the other diesel oxidation catalyst 2). The catalyst inner case 4 is largely exposed outside by separation (disassemble) of the catalyst outer case 5 and the filter outer case 21. Therefore, the exposure range of the catalyst inner case 4 (the other diesel oxidation catalyst 2) is increased, and a maintenance operation such as a removing operation of soot of the soot filter 3 can easily be carried out.

As shown in FIGS. 1 to 5, the diesel oxidation catalyst 2 and the soot filter 3 are provided as a plurality set of gas purifying filters, and the catalyst-side flange 25 and the filter-side flange 26 offset with respect to the outer periphery of the soot filter 3. Therefore, the end of the exhaust gas inlet-side inner case 20 of the soot filter 3 can largely be exposed from an end surface of the outer case 21, the maintenance operation such as removing operation of soot attached to the soot filter 3 and the inner case 20 can easily be carried out.

As shown in FIGS. 1 to 5, the two kinds of diesel oxidation catalyst 2 and soot filter 3 are provided, and the sensor-mounting space 29 is formed between the catalyst inner case 4 in which the one diesel oxidation catalyst 2 is provided and the filter inner case 20 in which the other soot filter 3 is provided. Therefore, a connection length of the catalyst outer case 5 and the filter outer case 21 in the moving direction of exhaust gas can be shortened, rigidity of the catalyst outer case 5 and the filter outer case 21 or the like can be enhanced, weights thereof can be reduced, and a gas sensor or the like can easily be disposed in the sensor-mounting space 29 at the connecting boundary position between the diesel oxidation catalyst 2 and the soot filter 3.

As shown in FIGS. 1 to 5, the sensor connecting plug 50 as a sensor supporting body is assembled into the catalyst outer case 5 which overlaps the filter inner case 20, and a gas sensor such as the filter inlet-side exhaust gas pressure sensor and the filter inlet-side exhaust gas temperature sensor (thermistor) (both not shown) is disposed at the connecting boundary position between the diesel oxidation catalyst 2 and the soot filter 3 through the sensor connecting plug 50. Therefore, rigidity of the catalyst outer case 5 and the filter outer case 21 can be enhanced, weights thereof can be reduced, and the sensor connecting plug 50 can compactly be disposed at the connecting boundary position between the diesel oxidation catalyst 2 and the soot filter 3.

As shown in FIGS. 1 to 5 and 8, the exhaust gas purifying device includes the diesel oxidation catalyst 2 or the soot filter 3 as the gas purifying filter which purifies exhaust gas discharged from the diesel engine 70, the catalyst inner case 4 or the filter inner case 20 as the inner case in which the diesel oxidation catalyst 2 or the soot filter 3 is provided, and the catalyst outer case 5 or the filter outer case 21 as the outer case in which the catalyst inner case 4 or the filter inner case 20 is provided. In the exhaust gas purifying device, the exhaust gas inflow opening 12 is formed in the peripheral surfaces on the side of one ends of the catalyst inner case 4 and the catalyst outer case 5, the exhaust gas inlet tube 16 is disposed on the outer periphery of the catalyst outer case 5 outside the exhaust gas inflow opening 12, and an area of an opening end surface of the exhaust gas inlet tube 16 on the exhaust gas inlet-side is formed larger than an area of an opening end surface of the exhaust gas inlet tube 16 on the exhaust gas outlet-side.

Therefore, the exhaust gas inlet tube can be disposed at a location close to the diesel oxidation catalyst 2, and it is possible to easily shorten a length of the catalyst outer case 5 (casing) in the moving direction of exhaust gas on the exhaust gas upstream side of the diesel oxidation catalyst 2. That is, an end surface of the diesel oxidation catalyst 2 can easily be disposed close to an end surface of the catalyst outer case 5 on the upstream side in the moving direction of exhaust gas. Since the area of the opening end surface of the exhaust gas inlet tube 16 on the exhaust gas outlet-side is formed larger than the area of the opening end surface of the exhaust gas inlet tube 16 on the exhaust gas inlet-side, the exhaust gas inlet tube 16 can be welded to the outer peripheral surface of the catalyst outer case 5, it is unnecessary to provide a reinforcing member for connecting the catalyst outer case 5 and the exhaust gas inlet tube 16 with each other unlike the conventional technique, a mounting strength of the exhaust gas inlet tube 16 with respect to the exhaust gas inlet-side of the catalyst outer case 5 can be maintained, and exhaust pressure losses of exhaust gas in the catalyst outer case 5 and the exhaust gas inlet tube 16 can be reduced.

As shown in FIGS. 1, 2, 5 and 8, an end edge of the exhaust gas inlet tube 16 on the exhaust gas outlet-side is fixed to an outer peripheral surface of an exhaust gas inlet of the catalyst outer case 5, and the exhaust gas inlet tube 16 offsets on the exhaust gas downstream side of the catalyst outer case 5 with respect to the exhaust gas inflow opening 12 of the catalyst outer case 5. Therefore, an exhaust gas upstream side end surface of the diesel oxidation catalyst 2 can be disposed upstream of exhaust gas from the opening edge of the exhaust gas inlet tube 16 on the exhaust gas downstream side, and the length of the catalyst outer case 5 in the moving direction of exhaust gas on the exhaust gas upstream side can easily be shortened. The length of the catalyst outer case 5 in the moving direction of exhaust gas can compactly be formed. That is, the exhaust gas outlet-side of the exhaust gas inlet tube 16 can be disposed such that it is separated away from a side end surface of the catalyst outer case 5 on the upstream side in the moving direction of exhaust gas. A size of the catalyst outer case 5 in the moving direction of exhaust gas can be reduced, the number of parts can be reduced as compared with the conventional technique, and the engine device can be reduced in cost, size, and weight thereof.

As shown in FIGS. 1, 2, 5 and 8, an opening size of the exhaust gas inlet tube 16 on the exhaust gas outlet-side is formed larger than an opening size of the exhaust gas inflow opening 12 of the catalyst outer case 5 and the catalyst inner case 4 in the moving direction of exhaust gas of the catalyst outer case 5. Therefore, it is unnecessary to provide a reinforcing member unlike the conventional technique, a mounting strength of the exhaust gas inlet tube 16 on the exhaust gas inlet-side of the catalyst outer case 5 can be maintained, and exhaust pressure losses of exhaust gas in the exhaust gas inlet tube 16 and the exhaust gas inflow opening 12 of the catalyst outer case 5 or the like can be reduced. As compared with the conventional structure in which the reinforcing member is provided, it is possible to reduce the number of constituent parts and to reduce the cost. An outer shape of the catalyst outer case 5 can compactly be formed, its weight can easily be reduced, and the exhaust gas inlet-sides of the catalyst outer case 5 and the exhaust gas inlet tube 16 can be formed with high rigidity. That is, exhaust gas inlets of the catalyst outer case 5 and the catalyst inner case 4 can be formed such that they are close to a side end surface of the catalyst outer case 5 on the upstream side in the moving direction of exhaust gas. A size of the catalyst outer case 5 in the moving direction of exhaust gas can be reduced, the number of parts can be reduced as compared with the conventional technique, and the engine device can be reduced in cost, size, and weight.

As shown in FIGS. 1, 2, 5 and 8, an end surface of the exhaust gas inlet tube 16 on the exhaust gas outlet-side upstream in the moving direction of exhaust gas of the diesel oxidation catalyst 2 or the soot filter 3 from an end of the exhaust gas inlet tube 16 on the downstream side in the moving direction of exhaust gas is disposed upstream of the catalyst outer case 5 in the moving direction of exhaust gas. Therefore, a length of the catalyst outer case 5 in the moving direction of exhaust gas on the exhaust gas upstream side can easily be shortened, and the length of the catalyst outer case 5 in the moving direction of exhaust gas can compactly be formed.

As shown in FIGS. 1, 2, 5 and 8, the end of the exhaust gas inlet tube 16 on the exhaust gas outlet-side is connected to the opening edge of the exhaust gas inflow opening 12 on the upstream side in the moving direction of exhaust gas of the catalyst outer case 5. Therefore, the length of the catalyst outer case 5 in the moving direction of exhaust gas on the upstream side of exhaust gas can easily be shortened, and exhaust gas pressure losses in the catalyst outer case 5 and the exhaust gas inlet tube 16 can be reduced.

The diesel oxidation catalyst 2 and the soot filter 3 are provided as the gas purifying filters which purify exhaust gas discharged from the engine, but instead of the diesel oxidation catalyst 2 and the soot filter 3, it is possible to provide NOx-selective reducing catalyst (NOx-removing catalyst) which reduces nitrogen oxide (NOx) in exhaust gas of the engine 70 by ammonia ($NH_3$) generated by adding urea (reducing agent), and ammonia-removing catalyst which removes residual ammonia discharged from NOx-selective reducing catalyst.

When the catalyst inner case 4 is provided with the NOx-selective reducing catalyst (NOx-removing catalyst) as the gas purifying filter and the filter inner case 20 is provided with ammonia-removing catalyst as described above, the nitrogen oxide (NOx) in exhaust gas discharged from the engine can be reduced, and it is discharged as harmless nitrogen oxide (NOx).

As shown in FIGS. 1 to 5, the exhaust gas purifying device includes the diesel oxidation catalyst 2 and the soot filter 3 as gas purifying filters which purify exhaust gas discharged from the diesel engine 70, the catalyst inner case 4 and the filter inner case 20 in which the diesel oxidation catalyst 2 and the soot filter 3 are provided, and the catalyst outer case 5 and the filter outer case 21 in which the catalyst inner case 4 and the filter inner case 20 are provided. In the exhaust gas purifying device, the catalyst inner case 4 and the filter inner case 20 are connected to the catalyst outer case 5 and the filter outer case 21, and the exhaust gas inlet tube 16 as an inlet constituent part to which an external stress is applied, and the supporting legs 19 as the supporting bodies are disposed on the catalyst outer case 5.

Therefore, the external stress can be supported by the catalyst outer case 5, and it is possible to reduce external stresses applied to the catalyst inner case 4 and the filter inner case 20 as deformation forces. By the double structure of the catalyst inner case 4 and the filter inner case 20 as well as the catalyst outer case 5 and the filter outer case 21, thermal insulation of the diesel oxidation catalyst 2 and the soot filter 3 is enhanced, the processing ability and the generating ability of the diesel oxidation catalyst 2 and the soot filter 3 can be enhanced, and it is possible to easily avoid a case where the supporting performance of the diesel oxidation catalyst 2 and the soot filter 3 is deteriorated by transmission of vibration from the engine and by distortion of welding operation.

As shown in FIGS. 1 to 5, the engine device includes the plurality set of diesel oxidation catalyst 2 and soot filter 3, catalyst inner case 4 and filter inner case 20, and catalyst outer case 5 and filter outer case 21, and the plurality set of catalyst outer case 5 and the filter outer case 21 are connected to each other by means of the catalyst-side flange 25 and the filter-side flange 26 as flange bodies. Therefore, the plurality set of catalyst inner case 4 and filter inner case 20, and the plurality set of catalyst outer case 5 and soot filter outer case 21 can be configured in terms of function while taking, into account, the configurations of the exhaust gas inlet tube 16 and the supporting leg 19 and movement of exhaust gas between the plurality set of diesel oxidation catalyst 2 and soot filter 3. The processing ability and the generating ability of the plurality set of diesel oxidation catalyst 2 and soot filter 3 can easily be enhanced.

As shown in FIGS. 1 to 5, lengths of the catalyst inner case 4 and the filter inner case 20 in the moving direction of exhaust gas is different from lengths of the catalyst outer case 5 and the filter outer case 21 in the moving direction of exhaust gas. Therefore, the flange body which connects the catalyst outer case 5 and the filter outer case 21 with each other can be offset with respect to a coupling position between the plurality set of diesel oxidation catalyst 2 and soot filter 3. The mounting distance between the plurality set of diesel oxidation catalyst 2 and soot filter 3 can easily be reduced or increased.

As shown in FIGS. 1 to 5, the engine device includes the plurality set of diesel oxidation catalyst 2 and soot filter 3, the catalyst inner case 4 and the filter inner case 20, and the catalyst outer case 5 and the filter outer case 21, the catalyst-side flange 25 and the filter-side flange 26 which connect the plurality set of catalyst outer case 5 and filter outer case 21 with each other are offset with respect to the coupling position between the plurality set of diesel oxidation catalyst 2 and soot filter 3, and the catalyst outer case 5 which is opposed to the one diesel oxidation catalyst 2 overlaps the filter inner case 20 which is opposed to the other soot filter 3.

Therefore, a coupling distance between the plurality set of diesel oxidation catalyst 2 and soot filter 3 can be reduced, and a sensor or the like can easily be disposed between the coupling between the plurality set of diesel oxidation catalyst 2 and soot filter 3. Lengths of the plurality set of catalyst outer case 5 and filter outer case 21 in the moving direction of exhaust gas can be shortened, and rigidity of the plurality set of catalyst outer case 5 and filter outer case 21 can be enhanced and weights thereof can be reduced. A coupling distance between the plurality set of diesel oxidation catalyst 2 and soot filter 3 can be shortened, and lengths of the plurality set of catalyst outer case 5 and filter outer case 21 in the moving direction of exhaust gas can be reduced.

As shown in FIGS. 1, 5, and 8 to 14, the engine device includes the diesel oxidation catalyst 2 or the soot filter 3 as the gas purifying filter which purifies exhaust gas discharged from the diesel engine 70, the catalyst inner case 4 or the filter inner case 20 as the inner case in which the diesel oxidation catalyst 2 or the soot filter 3 is provided, and the catalyst outer case 5 or the filter outer case 21 as the outer case in which the catalyst inner case 4 or the filter inner case 20 is provided. The exhaust gas inlet tube 16 is disposed outside the catalyst outer case 5, and the exhaust gas inflow opening 12 opens at the catalyst inner case 4 or the filter inner case 20, and the catalyst outer case 5 or the filter outer case 21 such as to be opposed to the exhaust gas inlet tube 16 on the exhaust gas outlet-side. The exhaust gas inflow space 11 as a rectification chamber is formed between the catalyst outer case 5 or the end surface of the catalyst outer case 5 of the filter outer case 21 on the upstream side in the moving direction of exhaust gas and the end surface of the diesel oxidation catalyst 2 or the soot filter 3, and the exhaust gas inflow space 11 is brought into communication with the exhaust gas inlet tube 16 through the exhaust gas inflow opening 12. Therefore, in a structure in which exhaust gas of the diesel engine 70 is put into the catalyst inner case 4 in a shearing direction which is perpendicular to a center line of the catalyst inner case 4, it is unnecessary to insert the exhaust gas inlet tube 16 into the exhaust gas inflow space 11. Therefore, it is possible to reduce the number of constituent parts of the structure of the catalyst outer case 5 in which the exhaust gas inlet tube 16 is provided, the engine device can be configured inexpensively, and it is possible to easily reduce the lengths of the catalyst inner case 4 or the filter inner case 20 as well as the catalyst outer case 5 or the filter outer case 21 in the moving direction of exhaust gas on the exhaust gas upstream side of the diesel oxidation catalyst 2 or the soot filter 3. That is, it is possible to easily shorten a relative distance between the exhaust gas inlet-side of the diesel oxidation catalyst 2 and upstream end surfaces of the catalyst inner case 4 and the catalyst outer case 5 in the moving direction of exhaust gas which are opposed to the exhaust gas inlet-side of the diesel oxidation catalyst 2. It is possible to dispose the diesel oxidation catalyst 2 in the vicinity of end surfaces of the catalyst inner case 4 and the catalyst outer case 5 on the upstream side in the moving direction of exhaust gas. It is possible to reduce sizes of the catalyst inner case 4 or the filter inner case 20 as well as the catalyst outer case 5 or the filter outer case 21 in the moving direction of exhaust gas, the number of parts can be reduced as compared with the conventional technique, and the engine device can be reduced in cost, size, and weight thereof.

As shown in FIGS. 1, 5, and 8 to 14, the opening size of the exhaust gas inflow opening 12 in the direction perpendicular to the moving direction of exhaust gas is formed larger than the opening size of the exhaust gas inflow opening 12 of the catalyst outer case 5 in the moving direction of exhaust gas of the catalyst outer case 5 or the filter outer case 21. Therefore, the mounting rigidity of the exhaust gas inlet tube 16 with respect to the catalyst outer case 5 is maintained, the sizes of the catalyst inner case 4 or the filter inner case 20 as well as the catalyst outer case 5 or the filter outer case 21 in the moving direction of exhaust gas can be reduced, the number of parts can be reduced as compared with the conventional technique, and the engine device can be reduced in cost, size, and weight thereof.

As shown in FIGS. 1, 5, and 8 to 14, the opening size of the exhaust gas inflow opening 12 is formed smaller than the opening size of an exhaust gas outlet of the exhaust gas inlet tube 16 in the moving direction of exhaust gas of the catalyst outer case 5 or the filter outer case 21. Therefore, it is possible to equally supply exhaust gas from the exhaust gas inflow space 11 to the exhaust gas inlet-side of the diesel oxidation catalyst 2, the gas purifying function of the diesel oxidation catalyst 2 is maintained, and it is possible to compactly configure the catalyst inner case 4 or the filter inner case 20 as well as the catalyst outer case 5 or the filter outer case 21, and they can be reduced in weight.

As shown in FIGS. 1, 5, and 8 to 14, the opening of the exhaust gas inflow opening 12 is formed into any one of an elliptic shape, a rectangular shape, a long hole shape, and a shape similar thereto, and the opening size of the exhaust gas inflow opening 12 of the catalyst outer case 5 in the moving direction of exhaust gas of the catalyst outer case 5 or the filter outer case 21 and the opening diameter size of the exhaust gas inlet-side of the exhaust gas inlet tube 16 are substantially equal to each other. Therefore, the opening area of the exhaust gas inflow opening 12 can be formed larger than the opening area of the exhaust gas inlet-side of the exhaust gas inlet tube 16. Exhaust gas can be dispersed in the direction perpendicular to the moving direction of exhaust gas of the diesel oxidation catalyst 2, exhaust gas can be moved from the exhaust gas inflow opening 12 into the exhaust gas inflow space 11, and drift of exhaust gas with respect to the diesel oxidation catalyst 2 can be reduced.

As shown in FIGS. 1, 5, and 8 to 14, the opening size of the exhaust gas inflow opening 12 of the catalyst outer case 5 in the moving direction of exhaust gas of the catalyst outer case 5 or the filter outer case 21 is substantially equal to the opening diameter size of the exhaust gas inlet-side of the exhaust gas inlet tube 16, the opening size of the exhaust gas inflow opening 12 in the direction perpendicular to the moving direction of exhaust gas is substantially equal to the opening diameter size of the exhaust gas outlet-side of the exhaust gas inlet tube 16, and the end of the exhaust gas outlet-side of the exhaust gas inlet tube 16 is connected to the opening edge of the exhaust gas inflow opening 12 on the upstream side in the moving direction of exhaust gas. Therefore, exhaust gas can be dispersed in the direction perpendicular to the moving direction of exhaust gas of the diesel oxidation catalyst 2, and exhaust gas can uniformly be moved from the exhaust gas inflow opening 12 into the exhaust gas inlet-side of the diesel oxidation catalyst 2. Drift of exhaust gas with respect to the diesel oxidation catalyst 2 can be reduced, and exhaust gas purifying ability of the diesel oxidation catalyst 2 can be enhanced.

A mounting structure of a silencer 30 will be described with reference to FIGS. 1 to 3, and 5 to 7. As shown in FIGS. 1 to 3, and 5, the silencer 30 which reduces sound of exhaust gas discharged from the diesel engine 70 includes a substantially cylindrical silencing inner case 31 made of heatproof metal, a substantially cylindrical silencing outer case 32 made of heatproof metal, and a circular right lid body 33 fixed to right ends of the silencing inner case 31 and the silencing outer case 32 by welding. The silencing inner case 31 is provided in the silencing outer case 32. The diameter size of the cylindrical catalyst inner case 4, the diameter size of the cylindrical filter inner case 20, and the diameter size of the cylindrical silencing inner case 31 are substantially the same. The diameter size of the cylindrical catalyst outer case 5, the diameter size of the cylindrical filter outer case 21, and the diameter size of the cylindrical silencing outer case 32 are substantially the same.

As shown in FIGS. 4 to 7, an exhaust gas outlet tube 34 penetrates the silencing inner case 31 and the silencing outer case 32. One end of the exhaust gas outlet tube 34 is closed with an outlet lid body 35. A large number of exhaust holes 36 are formed in an entire exhaust gas outlet tube 34 in the silencing inner case 31. An interior of the silencing inner case 31 is in communication with the exhaust gas outlet tube 34 though the large number of exhaust holes 36. A silencer and a tail pipe (both not shown) are connected to the other end of the exhaust gas outlet tube 34.

Figure 6:
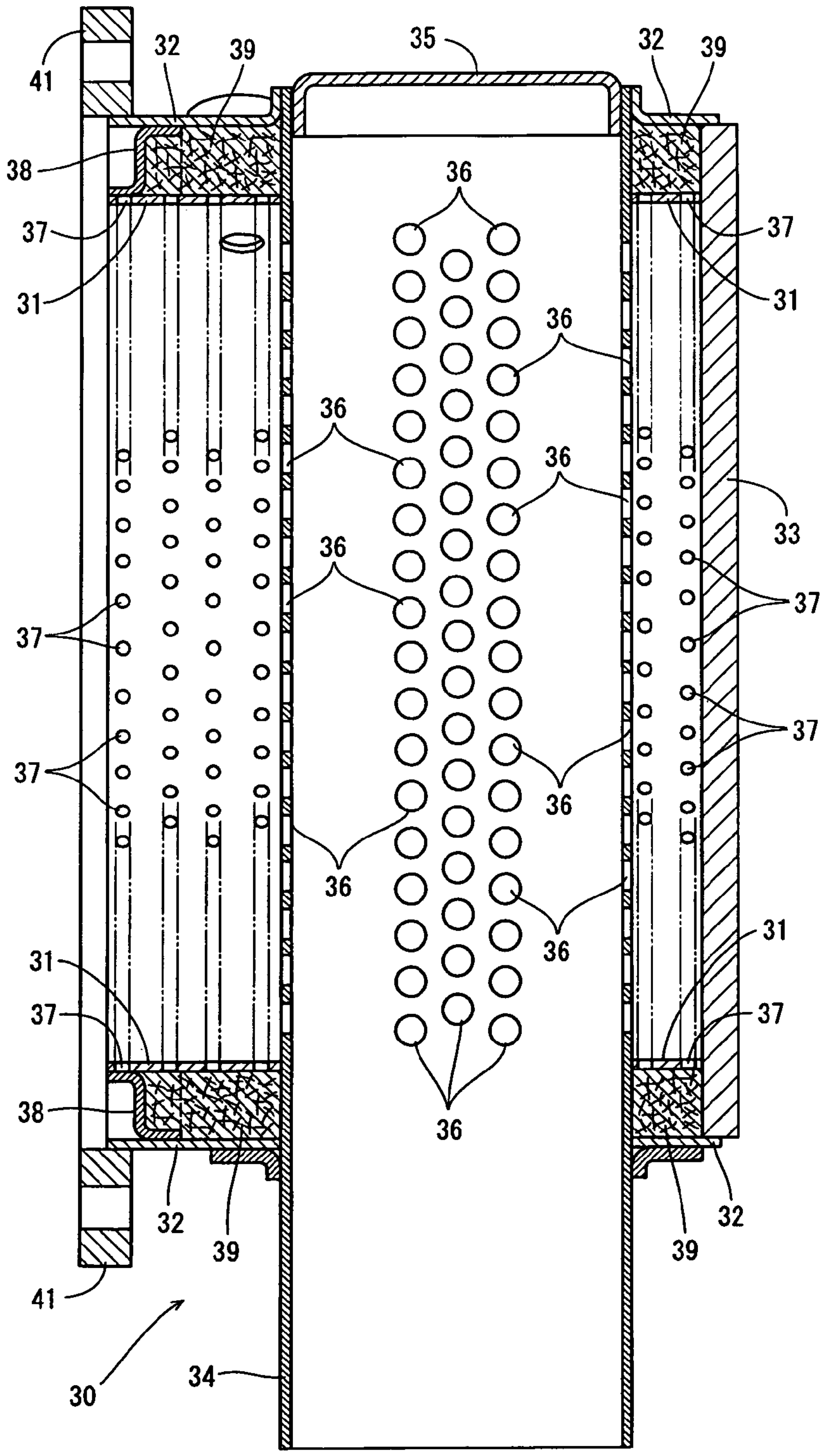
FIG. 6 is an enlarged front sectional view thereof on the discharge side of exhaust gas.
Figure 7:
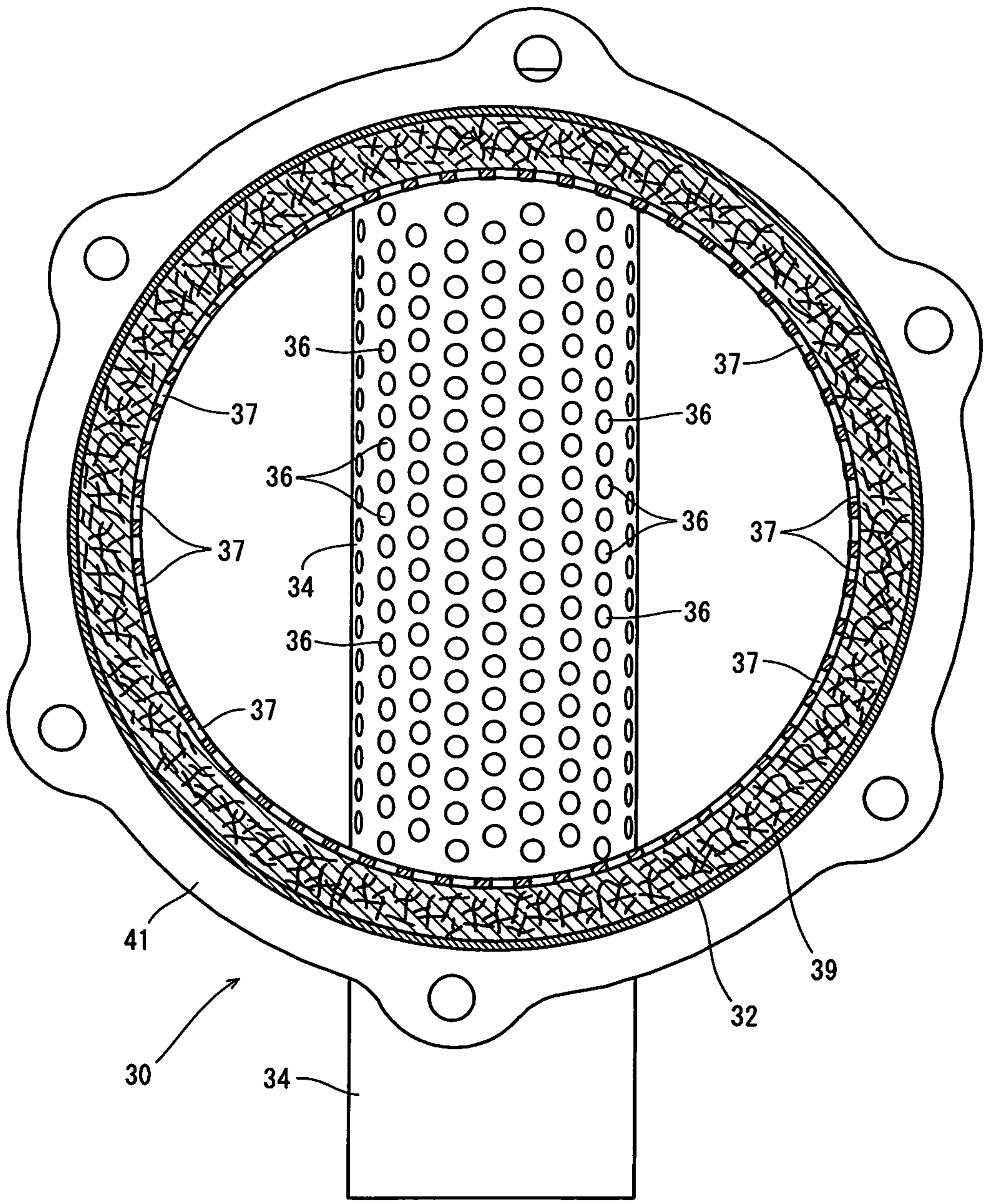
FIG. 7 is an enlarged side sectional view thereof on the discharge side of exhaust gas.

As shown in FIGS. 6 and 7, a large number of silencing holes 37 are formed in the silencing inner case 31. An interior of the silencing inner case 31 is in communication with a space between the silencing inner case 31 and the silencing outer case 32 through the large number of silencing holes 37. The space between the silencing inner case 31 and the silencing outer case 32 is closed with the right lid body 33 and a thin plate support body 38. A ceramic fiber silencing material 39 is charged between the silencing inner case 31 and the silencing outer case 32. An end of the silencing inner case 31 on the upstream side (left side) in the moving direction of exhaust gas is connected to an end of the silencing outer case 32 on the upstream side (left side) in the moving direction of exhaust gas of the silencing outer case 32 through the thin plate support body 38.

According to this configuration, exhaust gas is discharged from the silencing inner case 31 through the exhaust gas outlet tube 34. In the silencing inner case 31, sound of exhaust gas (mainly sound of high frequency band) is absorbed by the silencing material 39 from the large number of silencing holes 37. Noise of exhaust gas discharged from the outlet side of the exhaust gas outlet tube 34 is reduced.

As shown in FIGS. 1 and 5, a filter-side outlet flange 40 is welded to ends of a filter inner case 20 and a filter outer case 21 on the downstream side (right side) in the moving direction of exhaust gas. A silencing-side flange 41 is welded to an end of the silencing outer case 32 on the upstream side (left side) in the moving direction of exhaust gas. The filter-side outlet flange 40 and the silencing-side flange 41 are detachably fastened to each other through bolts 42 and nuts 43. A sensor connecting plug 44 is fixed to the filter inner case 20 and the filter outer case 21. An outlet-side exhaust gas pressure sensor and an outlet-side exhaust gas temperature sensor (thermistor) (both not shown) or the like are connected to the sensor connecting plug 44.

As shown in FIGS. 1, 2, and 5 to 7, the exhaust gas purifying device includes the diesel oxidation catalyst 2 or the soot filter 3 as the gas purifying filter which purifies exhaust gas discharged from the diesel engine 70, the catalyst inner case 4 or the filter inner case 20 as the inner case in which the diesel oxidation catalyst 2 or the soot filter 3 is provided, and the catalyst outer case 5 or the filter outer case 21 as the outer case in which the catalyst inner case 4 or the filter inner case 20 is provided. The exhaust gas purifying device also includes the silencing material 39 as an exhaust sound reducing body which reduces exhaust sound of exhaust gas discharged from the diesel engine 70, and the silencing material 39 is disposed on the exhaust gas outlet-side end of the catalyst outer case 5 or the filter outer case 21. Therefore, the exhaust gas purifying function of the diesel oxidation catalyst 2 or the soot filter 3 is maintained, and the exhaust gas silencing function can easily be added without changing a structure of the diesel oxidation catalyst 2 or the soot filter 3. For example, it is possible to easily configure an exhausting structure in which a tail pipe is connected directly to the outer case, and an exhausting structure in which the silencing function of an existing silencer is enhanced. It was difficult to take high frequency reducing countermeasures of exhaust gas at a location of the diesel oxidation catalyst 2 or the soot filter 3, but the high frequency reducing countermeasures can easily be carried out. For example, a silencing structure (silencing material 39) formed from a punch hole and a fiber mate or the like can easily be installed.

As shown in FIGS. 5 to 7, the engine device includes the silencer 30 having the silencing material 39, and the silencer 30 is detachably connected to the exhaust gas outlet-side end of the filter outer case 21. Therefore, the silencing function of exhaust gas at a location of the diesel oxidation catalyst 2 or the soot filter 3 can easily be changed by attaching and detaching the silencer 30.

As shown in FIGS. 5 to 7, the engine device includes the silencer 30 having the silencing material 39, the catalyst outer case 5 or the filter outer case 21 and the silencer 30 are formed into cylindrical shapes having substantially equal outer diameter sizes, the filter-side outlet flange 40 as a ring-shaped flange body is provided on the exhaust gas outlet-side end of the filter outer case 21, and the silencing material 39 is detachably connected to the exhaust gas outlet-side end of the filter outer case 21 through the filter-side outlet flange 40. Therefore, by connecting the silencer 30 having substantially equal outer diameter size to the filter outer case 21 by means of the filter-side outlet flange 40, and by increasing the mounting size of the catalyst outer case 5 or the filter outer case 21 in the moving direction of exhaust gas, the silencer 30 can compactly be assembled. For example, the catalyst outer case 5 or the filter outer case 21 can easily be installed such that it is close to a side surface of the exhaust gas discharging portion of the diesel engine 70. By maintaining the temperature of exhaust gas, it is possible to enhance the gas purifying function of the diesel oxidation catalyst 2 or the soot filter 3, and it is possible to easily take the high frequency reducing countermeasures by installing the silencing material 39.

As shown in FIGS. 5 to 7, the engine device includes the silencing inner case 31 and the silencing outer case 32 as silencer casings in which the silencing material 39 is provided, and the exhaust gas outlet tube 34 having a closed one end and the other end which is in communication with the tail pipe (not shown), a forming portion of the exhaust holes 36 of the exhaust gas outlet tube 34 penetrates the silencing inner case 31 and the silencing outer case 32, and the silencing inner case 31 and the silencing outer case 32 are detachably connected to the exhaust gas outlet-side end of the filter outer case 21 through the filter-side outlet flange 40. Therefore, the silencing function of exhaust gas at a location of the diesel oxidation catalyst 2 or the soot filter 3 can easily be changed by attaching and detaching the silencing inner case 31 and the silencing outer case 32. For example, it is possible to easily configure the exhausting structure in which the silencing function of exhaust gas is further enhanced by installing another silence (not shown) which is different from the silencing inner case 31 and the silencing outer case 32. On the other hand, it is possible to easily configure the exhausting structure in which the tail pipe (not shown) is connected directly to the filter outer case 21 by disposing the silencing inner case 31 and the silencing outer case 32 in which the silencing material 39 is not provided. As the high frequency reducing countermeasures of exhaust gas which were difficult to be taken at a location of the diesel oxidation catalyst 2 or the soot filter 3, it is possible to easily configure the silencing material 39 (punch hole and fiber mat) silencing structure in the silencing inner case 31 and the silencing outer case 32.

As shown in FIGS. 5 to 7, the silencer casing includes the cylindrical silencing inner case 31 and the cylindrical silencing outer case 32, the silencing inner case 31 is disposed in the silencing outer case 32, the silencing material 39 is charged in between the silencing inner case 31 and the silencing outer case 32, and the large number of silencing holes 37 are formed in the silencing inner case 31. Therefore, it is possible to configure the silencer casing (silencing inner case 31 and the silencing outer case 32) such that the silencer casing is closely analogous to the exhaust gas purifying structure including the catalyst inner case 4 or the filter inner case 20 in which the diesel oxidation catalyst 2 or the soot filter 3 is provided, and the catalyst outer case 5 or the filter outer case 21. It is possible to form the silencing inner case 31 or the silencing outer case 32 of the silencer casing utilizing the same material (such as pipe) as that of the catalyst inner case 4 or the filter inner case 20 in which the diesel oxidation catalyst 2 or the soot filter 3 is provided, and the catalyst outer case 5 or the filter outer case 21. It is possible to easily reduce the producing cost of the silencer casing.

Figure 10:
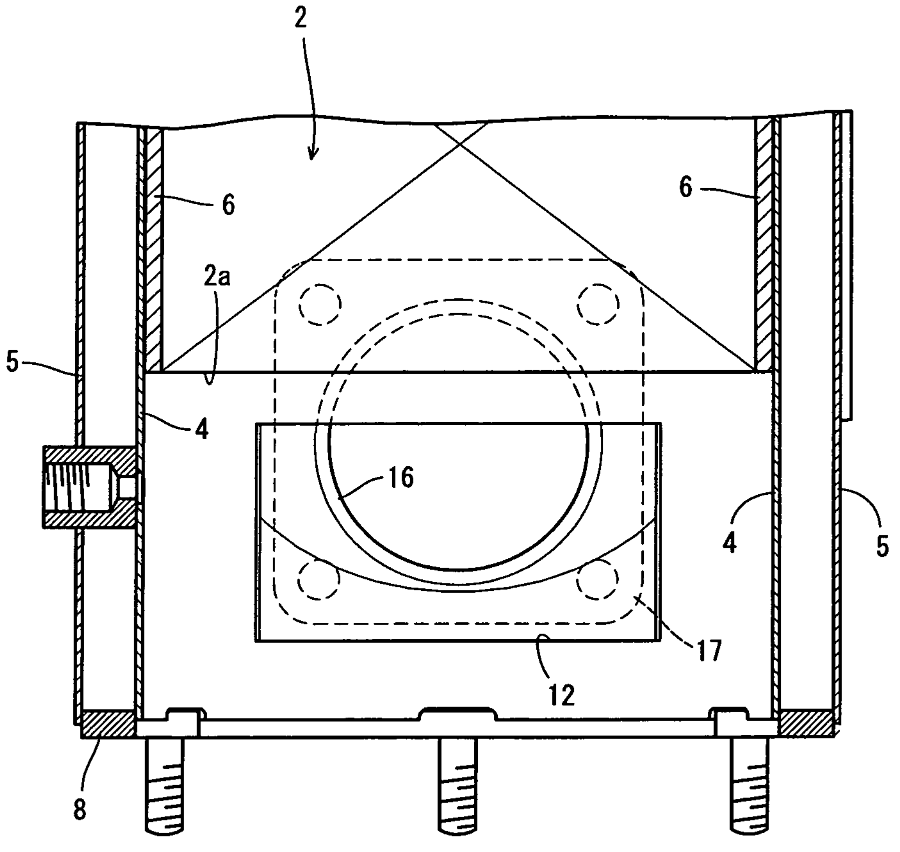
FIG. 10 is an enlarged plan sectional view of a modification of FIG. 9 on the inflow side of exhaust gas.
Figure 11:
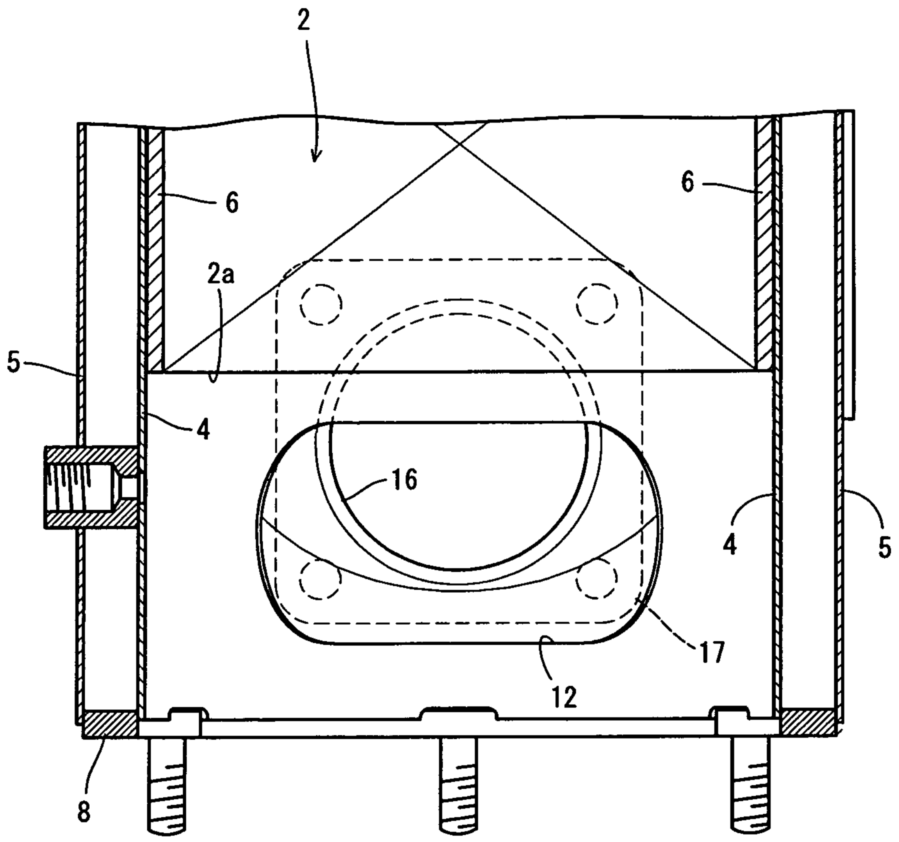
FIG. 11 is an enlarged plan sectional view of another modification of FIG. 9 on the inflow side of exhaust gas.
Figure 12:
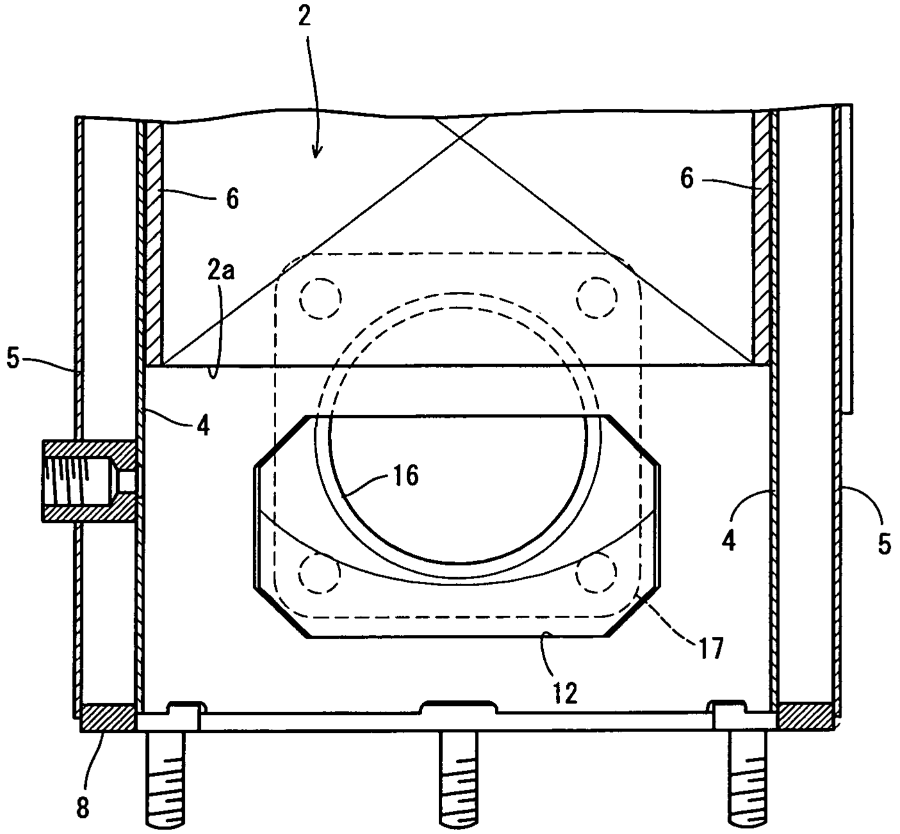
FIG. 12 is an enlarged plan sectional view of another modification of FIG. 9 on the inflow side of exhaust gas.
Figure 13:
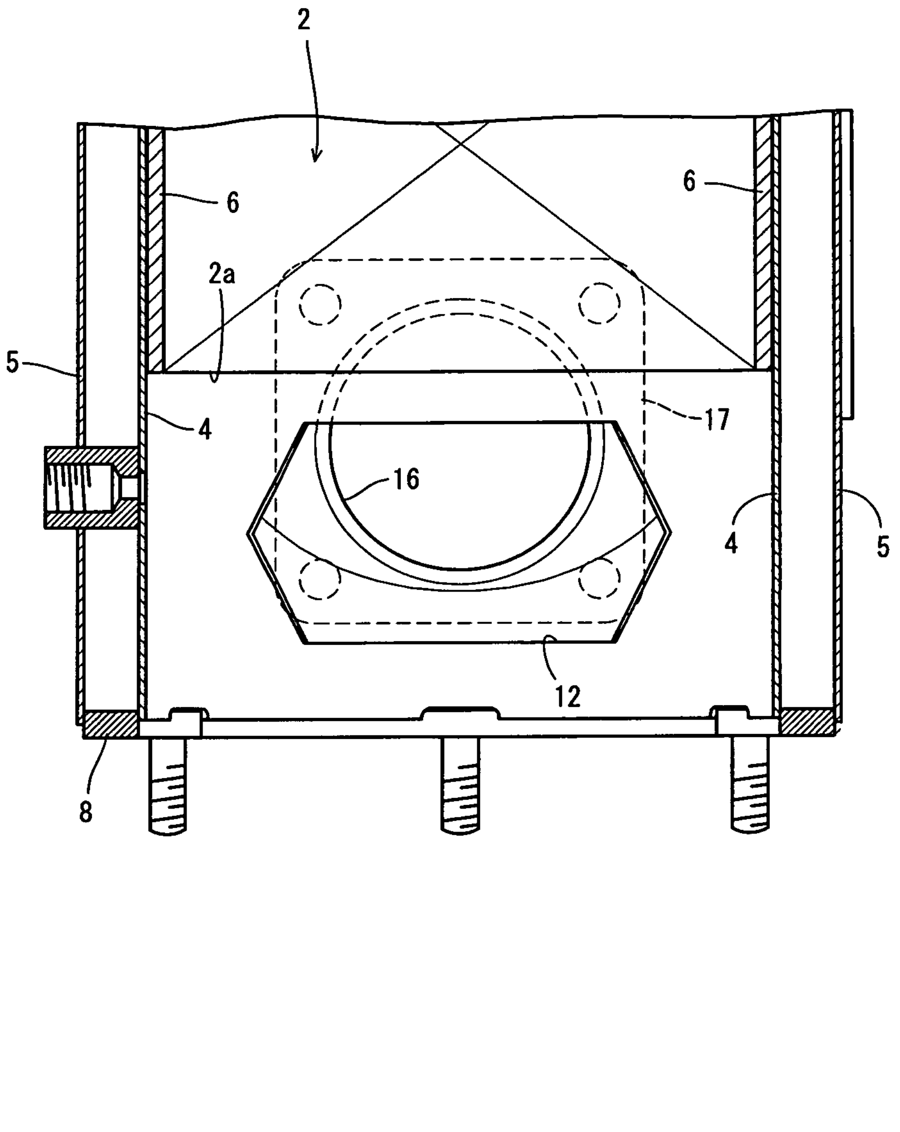
FIG. 13 is an enlarged plan sectional view of another modification of FIG. 9 on the inflow side of exhaust gas.
Figure 14:
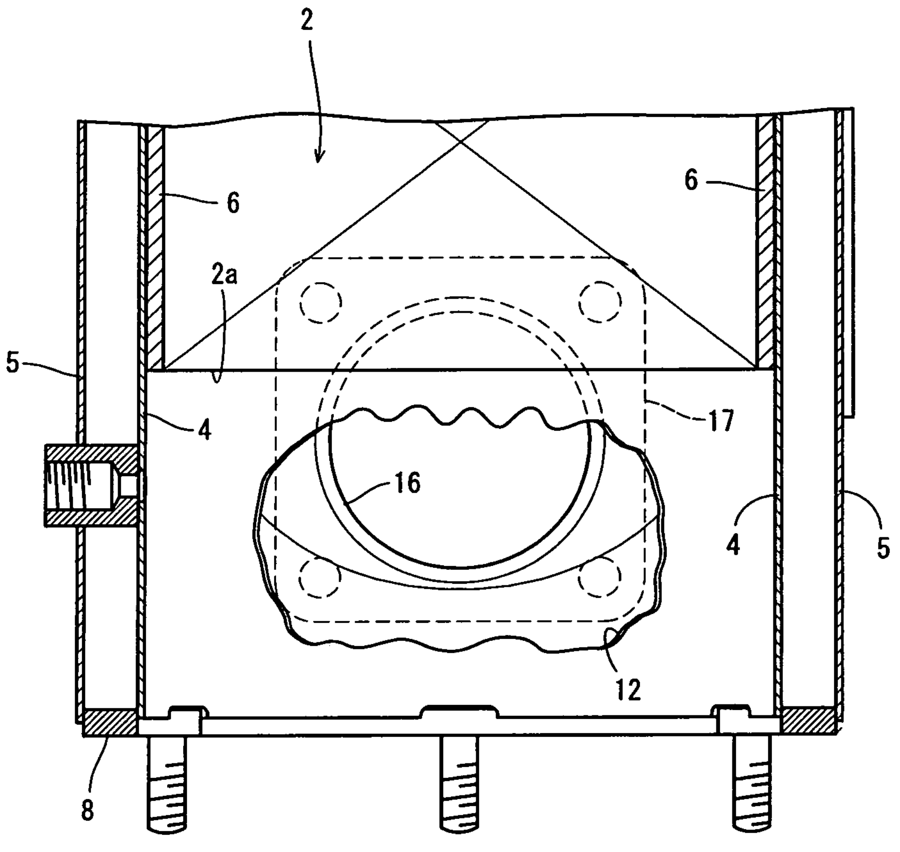
FIG. 14 is an enlarged plan sectional view of another modification of FIG. 9 on the inflow side of exhaust gas.

A deformed structure of the exhaust gas inflow opening 12 will be described with reference to FIGS. 10 to 14. In the embodiment, the exhaust gas inflow opening 12 is formed by forming a substantially elliptic through hole in the catalyst inner case 4 and the catalyst outer case 5 as shown in FIG. 9. The exhaust gas inflow opening 12 can also be formed by forming a substantially rectangular through hole in the catalyst inner case 4 and the catalyst outer case 5 as shown in FIG. 10. The exhaust gas inflow opening 12 can also be formed by forming a substantially long circular through hole in the catalyst inner case 4 and the catalyst outer case 5 as shown in FIG. 11. The exhaust gas inflow opening 12 can also be formed by forming a substantially polygonal through hole in the catalyst inner case 4 and the catalyst outer case 5 as shown in FIG. 12. The exhaust gas inflow opening 12 can also be formed by forming a substantially hexagonal through hole in the catalyst inner case 4 and the catalyst outer case 5 as shown in FIG. 13. The exhaust gas inflow opening 12 can also be formed by forming an indefinite through hole in the catalyst inner case 4 and the catalyst outer case 5 as shown in FIG. 14.

A structure in which the diesel engine 70 is provided with the DPF 1 will be described with reference to FIGS. 15 to 18. As shown in FIGS. 15 to 18, the exhaust manifold 71 and an intake manifold 73 are disposed in left and right side surfaces of the cylinder head 72 of the diesel engine 70. The cylinder head 72 is provided on the cylinder block 75 having an engine output shaft 74 (crankshaft) and a piston (not shown). A front end and a rear end of the engine output shaft 74 project from the front surface and a rear surface of the cylinder block 75 respectively. A cooling fan 76 is provided on the front surface of the cylinder block 75. A rotation force is transmitted from a front end of the engine output shaft 74 to the cooling fan 76 through a V-belt 77.

Figure 15:
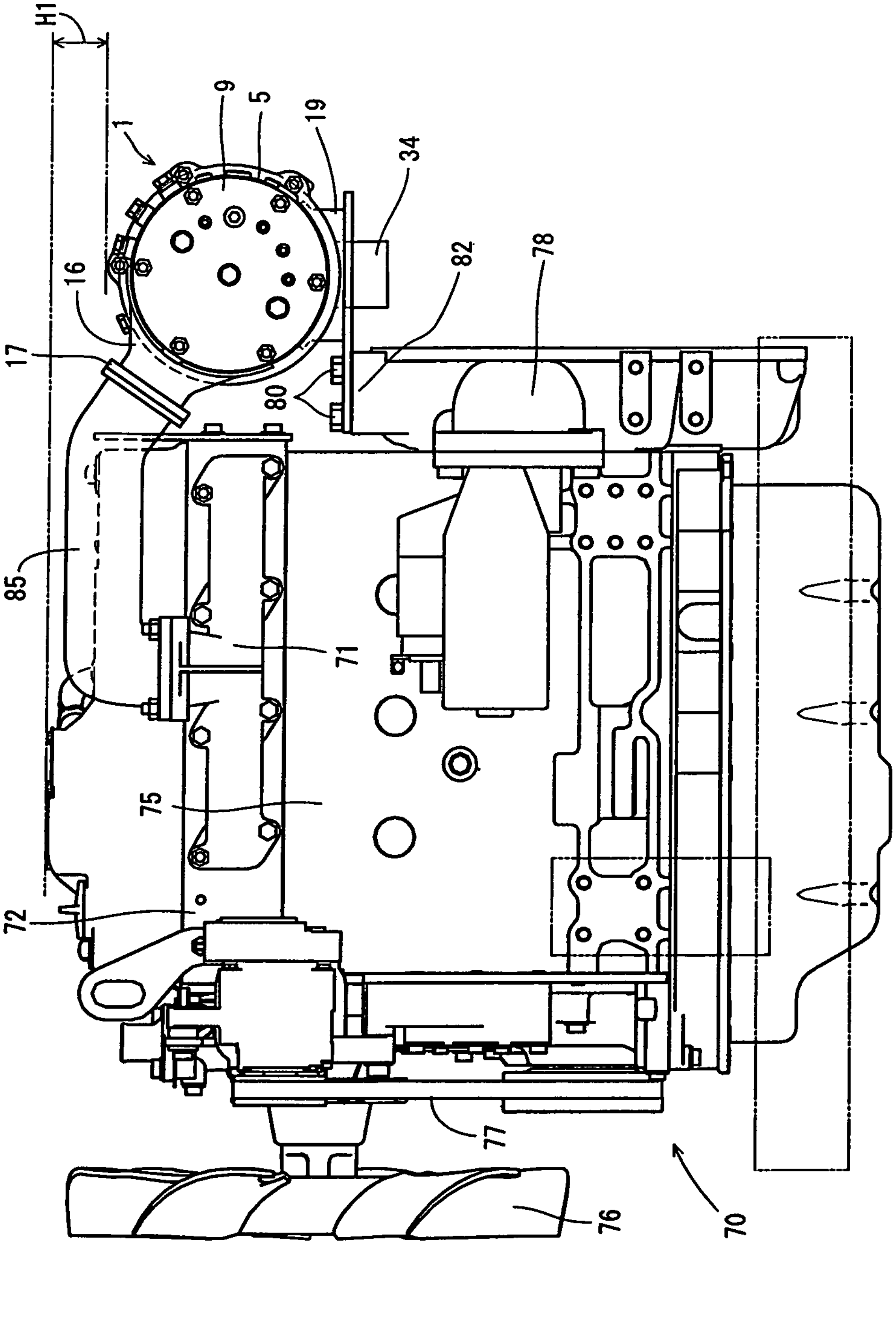
FIG. 15 is a left side view of a diesel engine.
Figure 16:
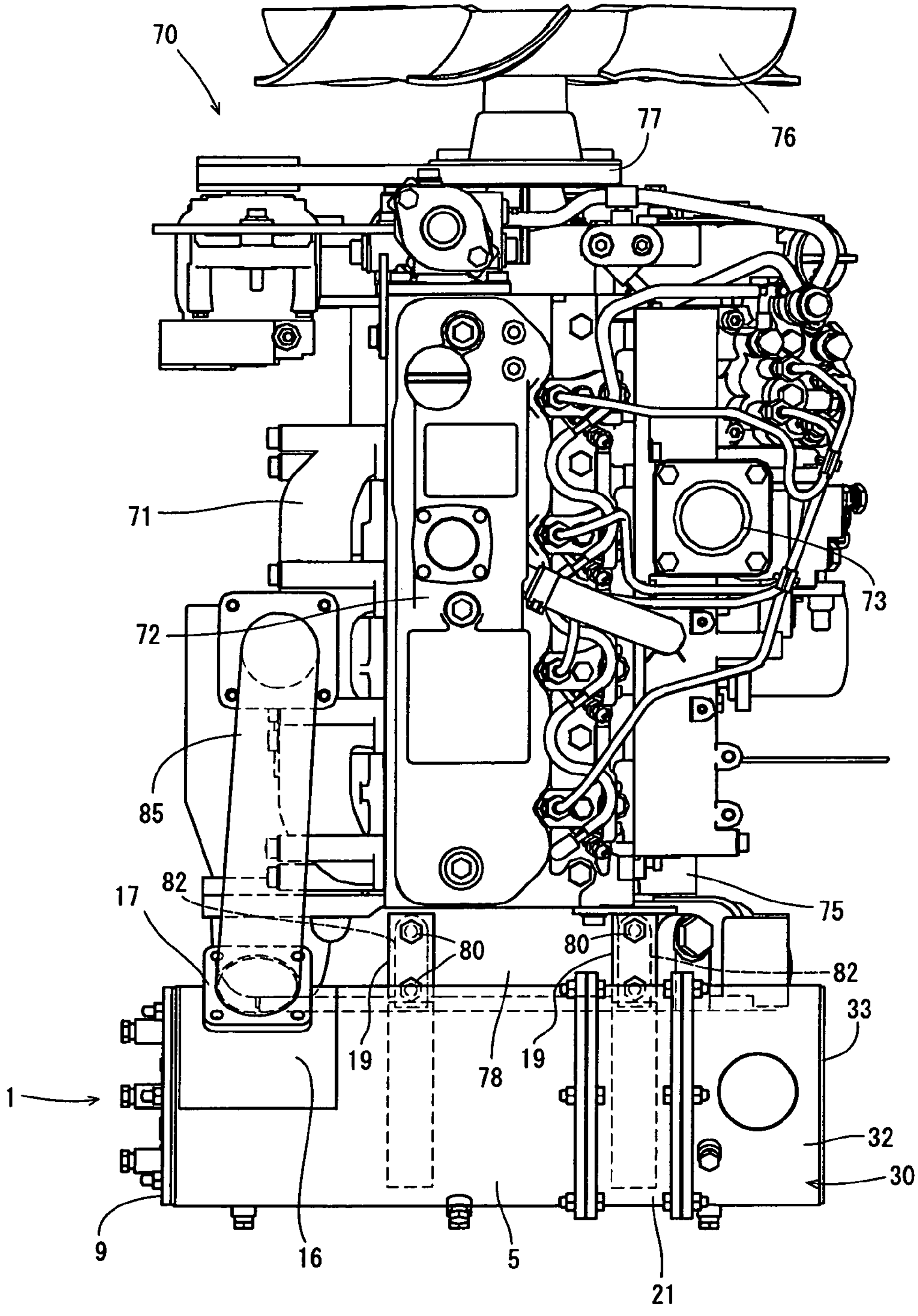
FIG. 16 is a plan view of the diesel engine.
Figure 18:
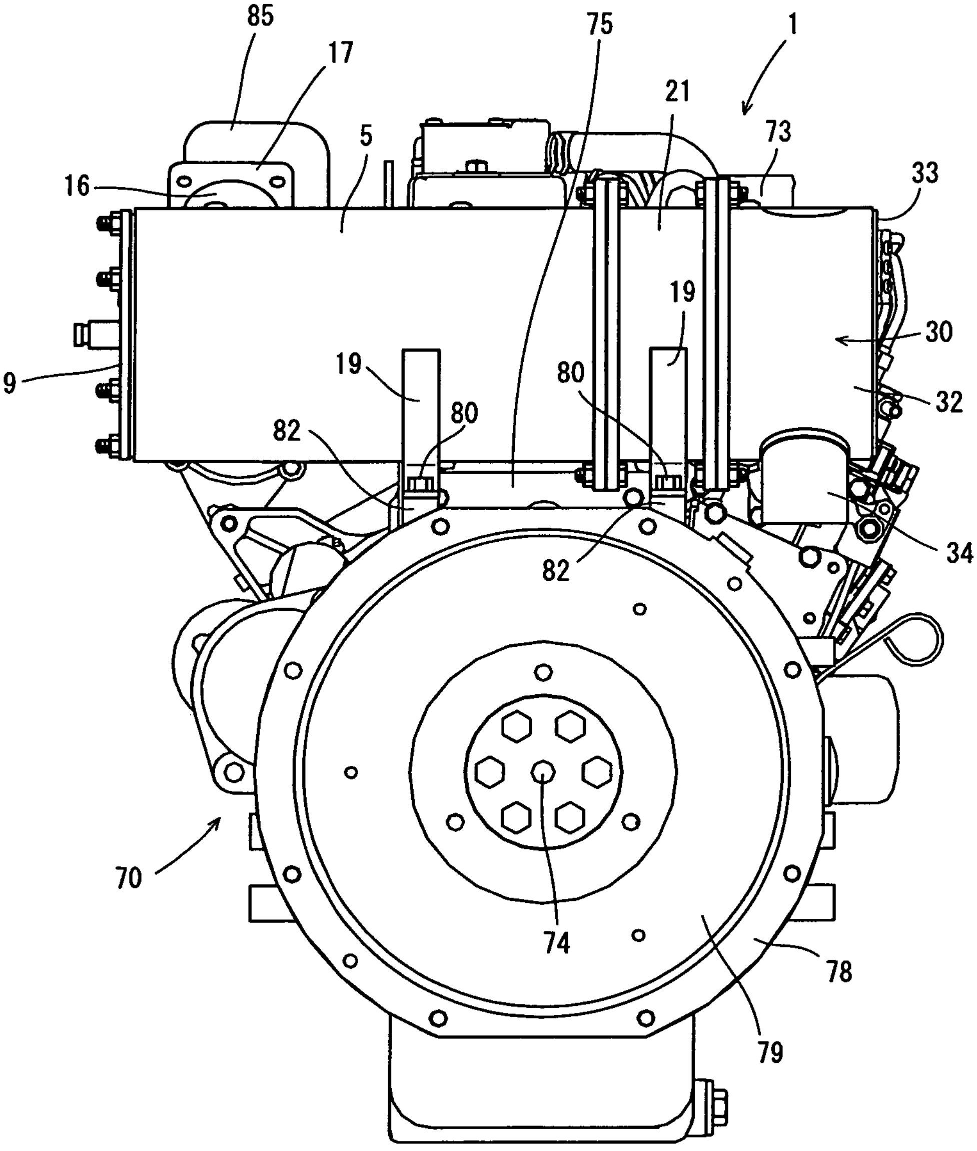
FIG. 18 is a back view of the diesel engine.

As shown in FIGS. 15, 16, and 18, a flywheel housing 78 is fixed to a rear surface of the cylinder block 75. A flywheel 79 is provided in the flywheel housing 78. The flywheel 79 is pivotally supported on a rear end of the engine output shaft 74. Power of the diesel engine 70 is taken out into operating portions such as later-described backhoe 100 and forklift 120 through the flywheel 79.

Figure 17:
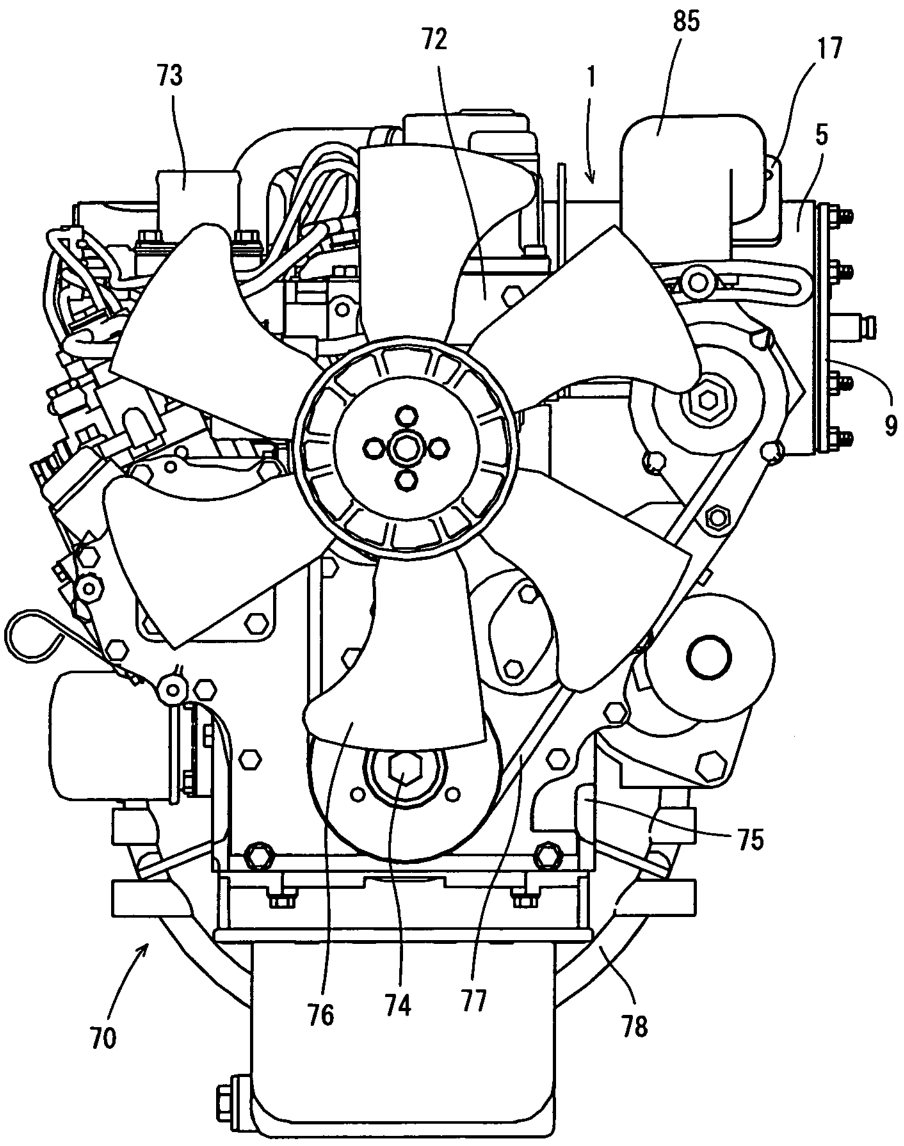
FIG. 17 is a front view of the diesel engine.

As shown in FIGS. 15, 17, and 18, one ends of the supporting legs 19 as filter supporting bodies are welded and fixed to the catalyst outer case 5 and the filter outer case 21. The other ends of the supporting legs 19 are detachably fastened to a mounting portion 82 formed on an upper surface of the flywheel housing 78 through bolts 80. Therefore, the DPF 1 described above is supported by the flywheel housing 78 having high rigidity through both the supporting legs 19.

As shown in FIGS. 15 to 18, the DPF 1 of this embodiment is long in a direction perpendicular to the engine output shaft 74, and the DPF 1 is disposed such that it is separated away from the upper surface of the diesel engine 70 so that the moving direction of exhaust gas is perpendicular to the engine output shaft 74 above the flywheel housing 78. Therefore, upper surfaces of the cylinder head 72, the exhaust manifold 72, and the intake manifold 73 are exposed so that a maintenance operation can easily be carried out. In this state, the DPF 1 is opposed to one side surface of the cylinder head 72 close to the flywheel housing 78.

As shown in FIG. 15, an upper end of the DPF 1 is lower than an upper end of the diesel engine 70 (cylinder head 72) by H1. If the diesel engine 70 is viewed from the cooling fan 76 (see FIG. 17), most of the DPF 1 is hidden by the diesel engine 70.

The exhaust gas inlet tube 16 is detachably connected to the exhaust manifold 71 of the diesel engine 70 through a relay exhaust tube 85. Exhaust gas moves into the DPF 1 from the exhaust manifold 71 of the diesel engine 70 through the relay exhaust tube 85 and the exhaust gas inlet tube 16, the exhaust gas is purified by the DPF 1, the exhaust gas moves into the tail pipe (not shown) from the exhaust gas outlet tube 34 and is finally discharged to outside of the device.

As apparent from the above-described configuration, the DPF 1 of this embodiment is connected to the exhaust manifold 71 of the engine 70, and is connected to the flywheel housing 78 through the plurality of filter supporting bodies (supporting legs 19). Therefore, there are effects that the DPF 1 can be disposed in the diesel engine 70 with high rigidity as one constituent parts of the diesel engine 70, the need of exhaust gas countermeasures for each of devices of the utility vehicle is eliminated, and the general versatility of the diesel engine 70 can be enhanced. That is, the DPF 1 is supported with high rigidity utilizing the flywheel housing 78 which is the high rigidity part of the diesel engine 70, and it is possible to prevent the DPF 1 from being damaged by vibration or the like.

The supporting legs 19 are provided on the upper portion of the flywheel housing 78, and the DPF 1 is connected to the upper portion of the flywheel housing 78 through the supporting legs 19. Therefore, there is an effect that the diesel engine 70 and the DPF 1 can compactly be formed together utilizing the space above the flywheel housing 78. This configuration can also contribute to reduction of the DPF 1 in size.

As shown in FIGS. 15 to 18, the DPF 1 is long in a direction perpendicular to the engine output shaft 74, and the DPF 1 is disposed such that it is separated away from the upper surface of the diesel engine 70. Therefore, for instance, the upper surfaces of the cylinder head 72, the exhaust manifold 72, and the intake manifold 73 can be exposed, and there is an effect that it is easy to carry out the maintenance operation of the diesel engine 70.

As shown in FIGS. 15 to 18, the cooling fan 76 is provided on the side surface of the diesel engine 70 which is opposite from the flywheel housing 78, and the DPF 1 is disposed such that it is opposed to one side surface of the cylinder head 72 located on the upper portion of the diesel engine 70 on the side of the flywheel housing 78. Therefore, the DPF 1 is hidden by the cylinder head 72 under the wind of the cooling fin 76. This prevents wind from the cooling fan 76 from directly hitting the DPF 1, it is possible to suppress reduction in temperature of the DPF 1 and thus temperature of exhaust gas in the DPF 1 by wind from the cooling fan 76, and the temperature of exhaust gas can be maintained.

As shown in FIGS. 15 to 18, a height of the upper surface of the DPF 1 is lower than a height of the upper surface of the diesel engine 70 so that the DPF 1 does not project upward higher than upper surface of the diesel engine 70. Thus, the influence of the DPF 1 on the entire height of the diesel engine 70 can be eliminated. Therefore, even if the DPF 1 is assembled into the diesel engine 70, the entire height of the diesel engine 70 can be suppressed as low as possible, and a barycenter of the diesel engine 70 is lowered, and vibration isolation can be enhanced. There is also a merit that it is possible to reliably prevent wind from the cooling fan 76 from directly hitting the DPF 1 of course.

As shown in FIGS. 15 to 18, the intake manifold 73 and the exhaust manifold 71 are disposed on both sides such as to clamp the cylinder head 72 of the diesel engine 70 as viewed from above, and are disposed on the side of the upper portion of the diesel engine 70, and the DPF 1 is connected to the exhaust manifold 71 and the intake manifold 73 above the diesel engine 70. Therefore, the DPF 1 can reliably be supported with high rigidity utilizing the exhaust manifold 71, the intake manifold 73, and the cylinder head 72 which are high rigidity parts of the diesel engine 70, and it is possible to effectively prevent the exhaust gas purifying device from being damaged by vibration.

As shown in FIGS. 1, 2, and 15 to 18, the exhaust gas inflow opening 12 and the exhaust gas outflow opening 34 are disposed on one end side and on the other end side of the DPF 1 in its longitudinal direction, the exhaust gas inflow opening 12 is disposed on one end of the DPF 1 on the side where the intake manifold 73 is installed, and the exhaust gas outflow opening 34 is disposed on the other end of the DPF 1 on the side where the exhaust manifold 71 is installed. Therefore, the DPF 1 can be connected and supported in a state where the DPF 1 is close to the upper surface of the cylinder head 72. The DPF 1 can be brought into communication with the exhaust manifold 71 within a short distance, and reduction of temperature of exhaust gas passing through the DPF 1 can be suppressed as small as possible. Thus, there is an effect that the exhaust gas purifying ability of the DPF 1 can be maintained at a high level.

Figure 19:
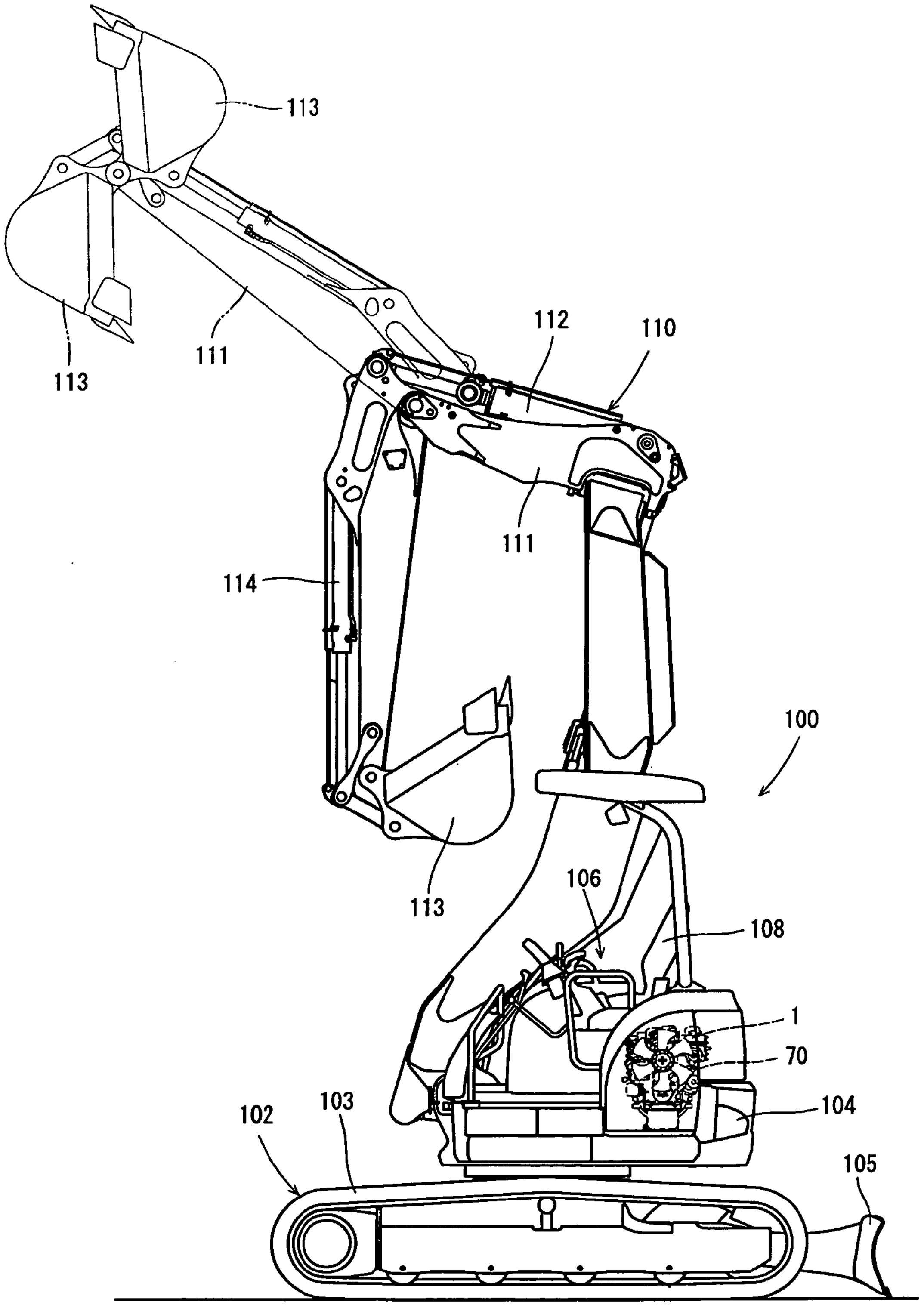
FIG. 19 is a side view of a backhoe.
Figure 20:
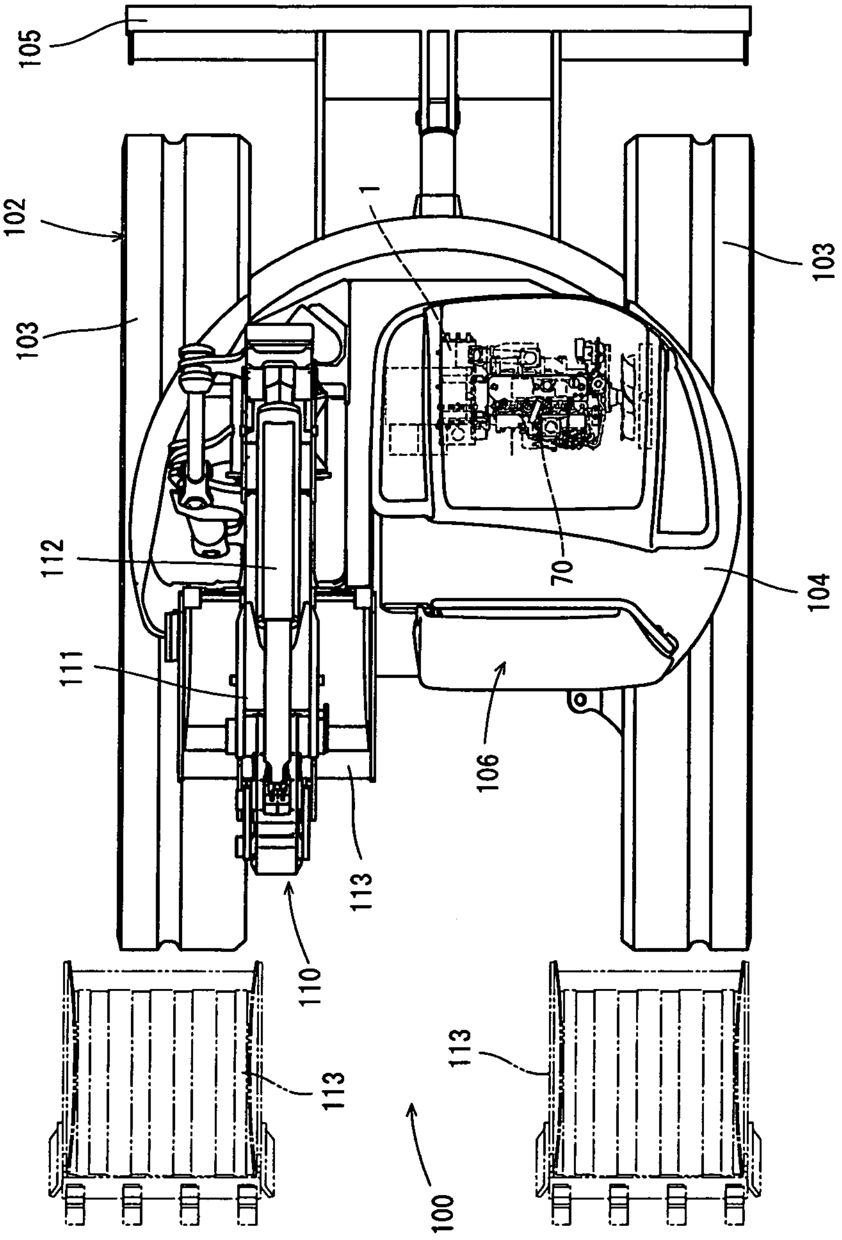
FIG. 20 is a plan view of the backhoe.

A structure in which the diesel engine 70 is provided in the backhoe 100 will be described with reference to FIGS. 19 and 20. As shown in FIGS. 19 and 20, the backhoe 100 includes a crawler track type running device 102 having a pair of left and right running crawlers 103, and a turning body frame 104 provided on the running device 102. The turning body frame 104 can horizontally turn in all directions over 360° by a turning hydraulic motor (not shown). A ground operation moldboard 105 is mounted on a rear portion of the running device 102 such that the moldboard 105 can vertically move. The driving portion 106 and the diesel engine 70 are provided on a left side of the turning body frame 104. An operating portion 110 having a boom 111 and a bucket 113 for excavating operation is provided on a right side of the turning body frame 104.

A driving seat 108 on which an operator sits, operating means for outputting operation of the diesel engine 70, and a lever or a switch as operating means for the operating portion 110 are disposed on the driving portion 106. A boom cylinder 112 and a bucket cylinder 114 are disposed on the boom 111 which is a constituent element of the operating portion 110. The bucket 113 as an excavating attachment is pivotally attached to a tip end of the boom 111 such that the bucket 113 can scoop and turn. The boom cylinder 112 or the bucket cylinder 114 is operated, and earthwork (ground operation such as forming operation of a groove) is carried out by the bucket 113.

Figure 21:
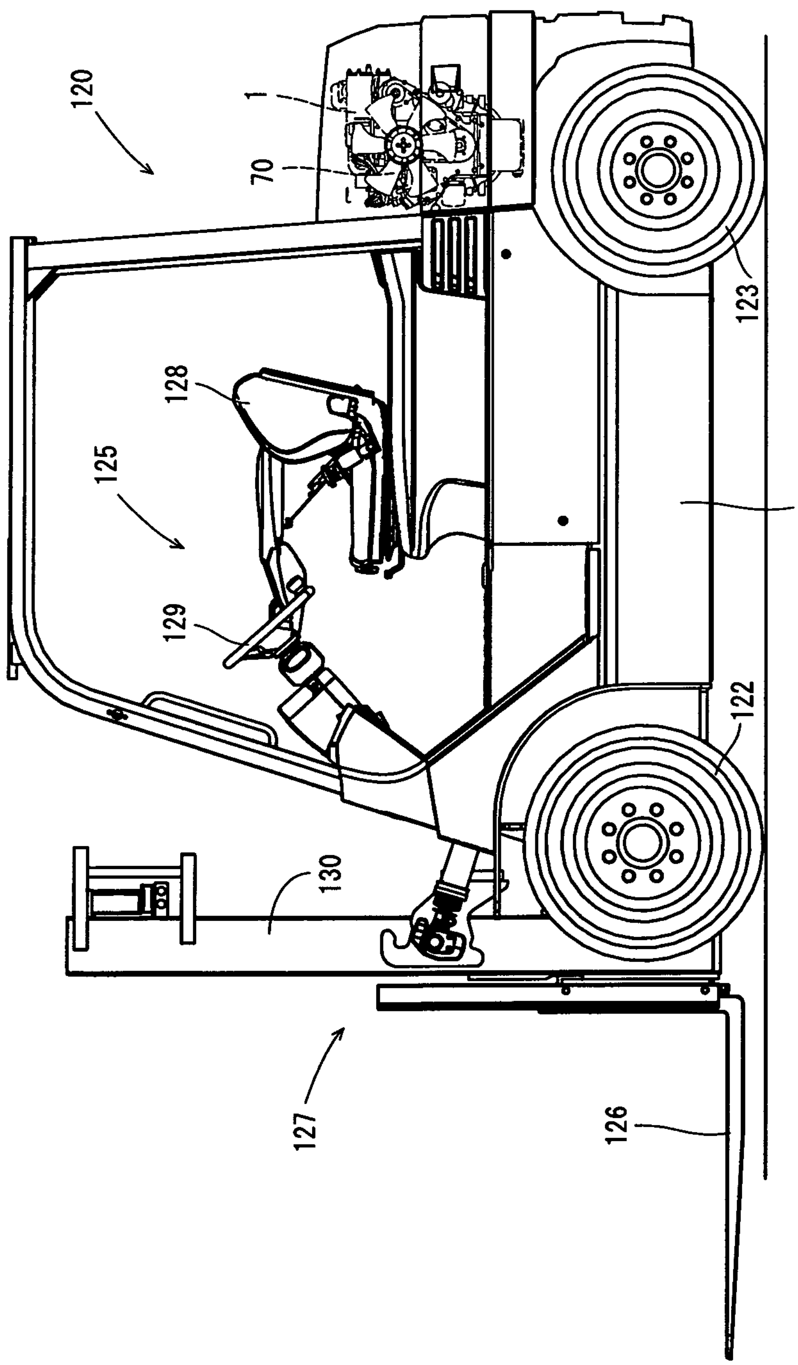
FIG. 21 is a side view of a forklift car.
Figure 22:
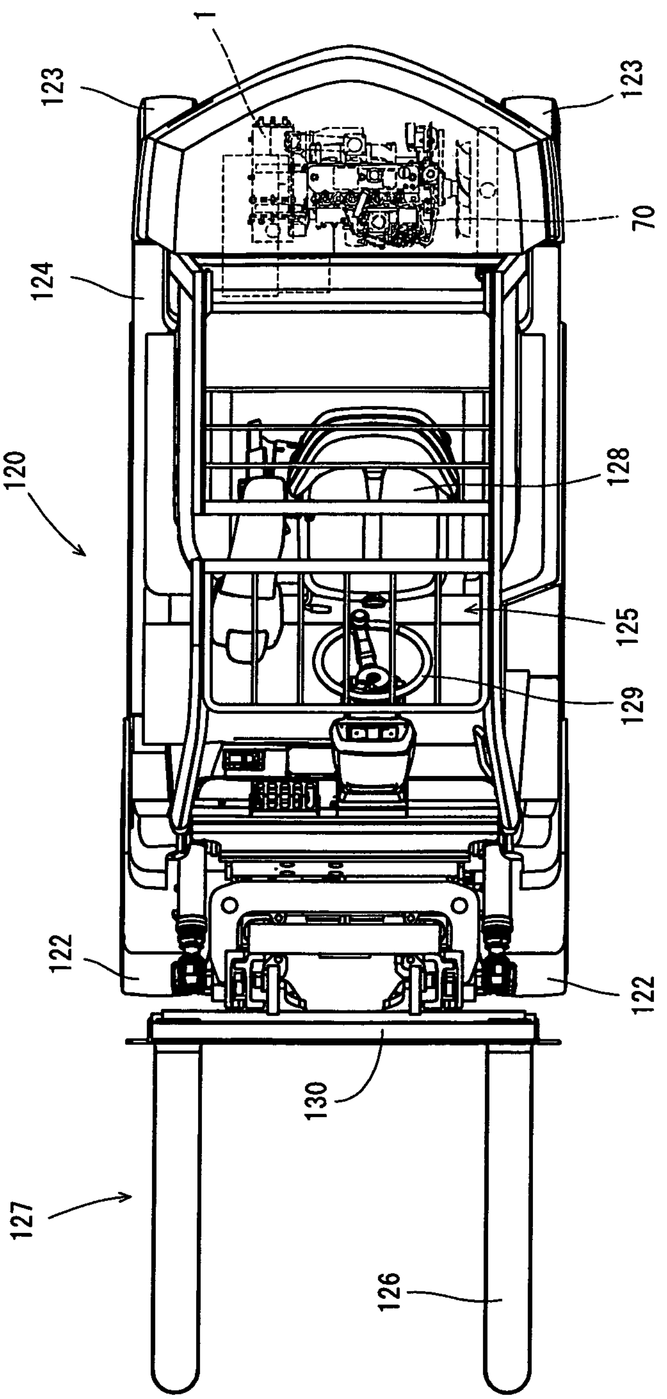
FIG. 22 is a plan view of the forklift car.

A structure in which the diesel engine 70 is provided in the forklift 120 will be described with reference to FIGS. 21 and 22. As shown in FIGS. 21 and 22, the forklift 120 includes a running body frame 124 having a pair of left and right front wheels 122 and a pair of left and right rear wheels 123. A driving portion 125 and the diesel engine 70 are provided in the running body frame 124. An operating portion 127 having a fork 126 for a cargo-handling operation is provided on a front side of the running body frame 124. A driving seat 128 on which an operator sits, a steering wheel 129, operating means for outputting operation of the diesel engine 70, and a lever or a switch as operating means for the operating portion 127 are disposed on the driving portion 125.

The fork 126 is disposed on a mast 130 which is a constituent element of the operating portion 127 such that the fork 126 can vertically move. The fork 126 is vertically moved, a palette (not shown) on which a cargo is placed is provided on the fork 126, the running body frame 124 is moved back-and-forth, and the cargo-handling operation such as transportation of the palette is carried out.

Structures of various portions of the present invention of this application are not limited to those described in the embodiment, and the invention can variously be changed within a range not departing from the subject matter of the invention of this application.

Reference Numerals

1 DPF (gas purifying filter)
16 exhaust gas inlet tube (exhaust gas inlet of DPF)
19 supporting leg (filter supporting body)
34 exhaust gas outlet tube (exhaust gas outlet of DPF)
70 diesel engine
71 exhaust manifold
78 flywheel housing

The invention claimed is:

1. An engine device comprising:
an engine having an intake manifold, an exhaust manifold, a cooling fan, and a flywheel housing;
an exhaust gas purifying device which purifies exhaust gas of the engine exiting the exhaust manifold; and
a filter supporting body that supports the exhaust gas purifying device; and
wherein the cooling fan is provided on a side surface of the engine which is opposite from a side surface of the engine at which the flywheel housing is located;
wherein the exhaust gas purifying device is connected to the engine at a first connection and at a second connection distinct from the first connection, the first connection being to the exhaust manifold, the second connection being to the flywheel housing and comprising the filter supporting body; and wherein the exhaust gas purifying device is disposed such that it is opposed to one side surface of a cylinder head located on an upper portion of the engine on the side surface at which the flywheel housing is located and opposite from the side surface of the engine at which the cooling fan is located, and thereby reduce occurrence of cooling wind from the cooling fan being blown directly to the exhaust gas purifying device.

2. The engine device according to claim 1, wherein the filter supporting body is provided on an upper portion of the flywheel housing, and the exhaust gas purifying device is connected to the upper portion of the flywheel housing through the filter supporting body.

3. The engine device according to claim 1, wherein the exhaust gas purifying device is elongated in a direction perpendicular to an output shaft of the engine, and the exhaust gas purifying device is disposed such that it is separated away from an upper surface of the engine.

4. The engine device according to claim 3, wherein a height of an upper surface of the exhaust gas purifying device is lower than a height of the upper surface of the engine, and the exhaust gas purifying device does not project upward higher than the upper surface of the engine.

5. The engine device according to claim 1, wherein the intake manifold and the exhaust manifold are disposed on an upper portion side of the engine on both sides such as to sandwich the cylinder head of the engine as viewed from above, and the exhaust gas purifying device is connected to the exhaust manifold and the intake manifold above the engine.

6. The engine device according to claim 5, wherein an exhaust gas inflow opening and an exhaust gas outflow opening are disposed on one end side and the other end side of the exhaust gas purifying device in its longitudinal direction, the exhaust gas inflow opening is disposed in one end of the exhaust gas purifying device on a side where the intake manifold is installed, and the exhaust gas outflow opening is disposed in the other end of the exhaust gas purifying device on a side where the exhaust manifold is installed.

* * * * *